US012658117B2

(12) United States Patent
Yoon et al.

(10) Patent No.: US 12,658,117 B2
(45) Date of Patent: Jun. 16, 2026

(54) SCAN DRIVER, DISPLAY DEVICE INCLUDING THE SCAN DRIVER, AND ELECTRONIC DEVICE INCLUDING THE DISPLAY DEVICE

(71) Applicant: SAMSUNG DISPLAY CO., LTD., Yongin-si (KR)

(72) Inventors: So Il Yoon, Yongin-si (KR); Jun Hyun Park, Yongin-si (KR); Young Wan Seo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/076,599

(22) Filed: Mar. 11, 2025

(65) Prior Publication Data

US 2025/0378780 A1 Dec. 11, 2025

(30) Foreign Application Priority Data

Jun. 5, 2024 (KR) ........................ 10-2024-0073406

(51) Int. Cl.
*G09G 3/32* (2016.01)

(52) U.S. Cl.
CPC ....... *G09G 3/32* (2013.01); *G09G 2300/0819* (2013.01); *G09G 2310/0267* (2013.01); *G09G 2310/0291* (2013.01); *G09G 2330/021* (2013.01)

(58) Field of Classification Search
CPC .............................................. G09G 2310/0291
See application file for complete search history.

(56) References Cited

U.S. PATENT DOCUMENTS

2022/0199039 A1* 6/2022 Lee ...................... G09G 3/3266
2025/0225907 A1* 7/2025 Liu .......................... G09G 3/20

FOREIGN PATENT DOCUMENTS

CN 103985363 A 8/2014
KR 10-2022-0016350 A 2/2022
KR 10-2477486 B1 12/2022

* cited by examiner

*Primary Examiner* — Gustavo Polo
(74) *Attorney, Agent, or Firm* — F. CHAU & ASSOCIATES, LLC

(57) ABSTRACT

A scan driver includes a unit stage including a plurality of stages configured to receive a plurality of clock signals and sequentially output a plurality of scan signals. The unit stage includes one sharing circuit and a plurality of buffer circuits each corresponding to the plurality of stages. The sharing circuit includes a first transistor configured to supply a start signal to a first node based on a first clock signal received from a first clock line, a second transistor configured to supply the first clock signal to a second node based on a voltage of the first node, and a third transistor configured to supply a gate low voltage to the second node based on the first clock signal. Each of the plurality of buffer circuits is directly connected to the first node and the second node and outputs the plurality of scan signals.

20 Claims, 16 Drawing Sheets

BML: BML3, BML4
ACTL: SE4, ACT4, DE4, SE5, ACT5, DE5
GTL1: GE4, C1a, GE5, C2a
GTL2: C1b, C2b
GTL3: GNE1
SDL1: CNE16, CNE17, CNE8
SDL2: VGHL, CKL2

ACTL: SE6
GTL2: NDE1
GTL3: GCL1, EML1
SDL1: CNE1, CNE2, CNE3

ACTL: SE6
GTL2: GCL1
GTL3: EML1
SDL1: CNE1, CNE2, CNE3
SDL2: NDE1

SCAN DRIVER, DISPLAY DEVICE INCLUDING THE SCAN DRIVER, AND ELECTRONIC DEVICE INCLUDING THE DISPLAY DEVICE

CROSS-REFERENCE TO RELATED APPLICATION

This application claims priority under 35 U.S.C. § 119 to Korean Patent Application No. 10-2024-0073406, filed on Jun. 5, 2024, the disclosure of which is incorporated by reference herein in its entirety.

TECHNICAL FIELD

Embodiments of the present disclosure relate to a scan driver, a display device including the scan driver, and an electronic device including the display device.

DISCUSSION OF RELATED ART

With the advancement of information technology, the demand for display devices capable of displaying an image has increased across various applications. For example, a display device may be included in various electronic devices such as smartphones, digital cameras, laptop computers, navigation devices, and smart televisions. A display device may include a light-emitting element in which each of a plurality of pixels of a display panel may themselves emit light, thereby displaying an image without a backlight unit providing the light to the display panel.

A display device includes a plurality of pixels, data lines and gate lines connected to the plurality of pixels, a data driver that supplies a data voltage to the data lines, and a scan driver that supplies a scan signal to the gate lines. The data driver and the scan driver may drive the plurality of pixels according to a predetermined frequency.

SUMMARY

Embodiments of the present disclosure provide a scan driver that may reduce an area of a non-display area and power consumption, a display device including the same, and an electronic device including the display device.

According to an embodiment of the present disclosure, a scan driver includes a unit stage including a plurality of stages configured to receive a plurality of clock signals, including a first clock signal, and sequentially output a plurality of scan signals. The unit stage includes one sharing circuit and a plurality of buffer circuits each corresponding to the plurality of stages. The sharing circuit includes a first transistor configured to supply a start signal to a first node based on a first clock signal received from a first clock line, a second transistor configured to supply the first clock signal to a second node based on a voltage of the first node, and a third transistor configured to supply a gate low voltage to the second node based on the first clock signal. Each of the plurality of buffer circuits is directly connected to the first node and the second node and outputs the plurality of scan signals.

In an embodiment, each of the plurality of buffer circuits includes a fourth transistor configured to supply a gate high voltage to an output node of its corresponding stage based on a voltage of the second node, a fifth transistor configured to supply one of the plurality of clock signals to the output node of its corresponding stage, and a sixth transistor configured to supply the voltage of the first node to a gate electrode of the fifth transistor based on the gate low voltage.

In an embodiment, each of the plurality of buffer circuits further includes a first capacitor connected between the second node and an input terminal of the gate high voltage, and a second capacitor connected between the gate electrode of the fifth transistor and the output node of its corresponding stage.

In an embodiment, the scan driver further includes a metal layer disposed on a substrate, an active layer disposed on the metal layer and including a semiconductor area of the first transistor, a first gate layer disposed on the active layer and including a gate electrode of the first transistor and a first electrode of the first capacitor, a second gate layer disposed on the first gate layer and including a second electrode of the first capacitor, a third gate layer disposed on the second gate layer, a first source metal layer disposed on the third gate layer, and a second source metal layer disposed on the first source metal layer and including a plurality of clock lines configured to supply the plurality of clock signals.

In an embodiment, the scan driver further includes a first node electrode disposed in the second gate layer and corresponding to the first node, a first connection electrode disposed in the first source metal layer and electrically connecting the first transistor, the first node electrode, and a sixth transistor of a first stage among the plurality of stages, a second connection electrode disposed in the first source metal layer and electrically connecting the first node electrode and a sixth transistor of a second stage among the plurality of stages, and a third connection electrode disposed in the first source metal layer and electrically connecting the first node electrode and a sixth transistor of a third stage among the plurality of stages.

In an embodiment, the first node electrode is disposed between the plurality of clock lines and does not overlap the second source metal layer.

In an embodiment, the scan driver further includes a first node electrode disposed in the second source metal layer and corresponding to the first node, a first connection electrode disposed in the first source metal layer and electrically connecting the first transistor, the first node electrode, and a sixth transistor of a first stage among the plurality of stages, a second connection electrode disposed in the first source metal layer and electrically connecting the first node electrode and a sixth transistor of a second stage among the plurality of stages, and a third connection electrode disposed in the first source metal layer and electrically connecting the first node electrode and a sixth transistor of a third stage among the plurality of stages.

In an embodiment, the scan driver further includes a second node electrode disposed in the second gate layer and corresponding to the second node, a fourth connection electrode disposed in the first source metal layer and electrically connecting the second node electrode and a gate electrode of a fourth transistor of a first stage among the plurality of stages, a fifth connection electrode disposed in the first source metal layer and electrically connecting the second node electrode and a gate electrode of a fourth transistor of a second stage among the plurality of stages, and a sixth connection electrode disposed in the first source metal layer and electrically connecting the second node electrode and a gate electrode of a fourth transistor of a third stage among the plurality of stages.

In an embodiment, the first capacitor of each of the plurality of buffer circuits includes a first electrode disposed in the first gate layer and including a gate electrode of the fourth transistor, and a second electrode disposed in the second gate layer and overlapping the first electrode.

In an embodiment, the scan driver further includes a seventh connection electrode disposed in the first source metal layer and electrically connecting a second clock line and a first electrode of a fifth transistor of a first stage among the plurality of stages, and an eighth connection electrode disposed in the first source metal layer and electrically connecting a second electrode of the fifth transistor of the first stage and an output node of the first stage. A second capacitor of the first stage may include a first electrode disposed in the first gate layer and including a gate electrode of the fifth transistor, and a second electrode disposed in the second gate layer and electrically connected to the eighth connection electrode.

In an embodiment, each of the plurality of stages includes the first to third transistors, respectively.

In an embodiment, the plurality of stages may include four or more stages, each of three stages may include the first to third transistors, respectively, and the remaining stages include a dummy unit disposed on a same layer as the first to third transistors.

According to an embodiment of the present disclosure, a scan driver includes first to third stages including one sharing circuit and a plurality of buffer circuits configured to sequentially output a plurality of scan signals. The sharing circuit includes a first transistor configured to supply a start signal to a first node based on a first clock signal among a plurality of clock signals, a second transistor configured to supply the first clock signal to a second node based on a voltage of the first node, and a third transistor configured to supply a gate low voltage to the second node based on the first clock signal. The buffer circuit of each of the first to third stages includes a fourth transistor configured to supply a gate high voltage to an output node of its corresponding stage based on a voltage of the second node, a fifth transistor configured to supply one of the plurality of clock signals to the output node, and a sixth transistor configured to supply the voltage of the first node to a gate electrode of the fifth transistor based on the gate low voltage.

In an embodiment, the scan driver further includes a metal layer disposed on a substrate, an active layer disposed on the metal layer and including a semiconductor area of the first transistor, a first gate layer disposed on the active layer and including a gate electrode of the first transistor and a first electrode of a first capacitor, a second gate layer disposed on the first gate layer and including a second electrode of the first capacitor, a third gate layer disposed on the second gate layer, a first source metal layer disposed on the third gate layer, and a second source metal layer disposed on the first source metal layer and including a plurality of clock lines configured to supply the plurality of clock signals.

In an embodiment, the scan driver further include a first connection electrode disposed in the first source metal layer and electrically connecting the first transistor and a sixth transistor of the first stage, and a first node electrode disposed in the second gate layer, connected to the first connection electrode, and corresponding to the first node. The first node electrode may be disposed between the plurality of clock lines and may not overlap the second source metal layer.

According to an embodiment of the present disclosure, a display device includes a display panel including a plurality of data lines to which a plurality of data voltages are applied, a plurality of gate lines intersecting the data lines, and a plurality of pixels connected to the data lines and the gate lines, where a gate signal is applied to each of the gate lines, a data driver configured to supply the data voltages to the data lines, and a scan driver configured to sequentially supply the gate signals to the gate lines. The scan driver includes first to third stages including one sharing circuit and a plurality of buffer circuits configured to sequentially output a plurality of scan signals. The sharing circuit includes a first transistor configured to supply a start signal to a first node based on a first clock signal, among a plurality of clock signals, received from a first clock line, among a plurality of clock lines, a second transistor configured to supply the first clock signal to a second node based on a voltage of the first node, and a third transistor configured to supply a gate low voltage to the second node based on the first clock signal. Each of the plurality of buffer circuits is directly connected to the first node and the second node and is configured to output a first gate signal, among the plurality of gate signals, to a first gate line, among the plurality of gate lines.

In an embodiment, the scan driver further includes a metal layer disposed on a substrate, an active layer disposed on the metal layer and including a semiconductor area of the first transistor, a first gate layer disposed on the active layer and including a gate electrode of the first transistor and a first electrode of the first capacitor, a second gate layer disposed on the first gate layer and including a second electrode of the first capacitor, a third gate layer disposed on the second gate layer, a first source metal layer disposed on the third gate layer, and a second source metal layer disposed on the first source metal layer and including the plurality of clock lines, which are configured to supply the plurality of clock signals.

In an embodiment, the pixel includes a first pixel transistor configured to control a driving current flowing through a light-emitting element, a second pixel transistor configured to supply a data voltage, among the plurality of data voltages, to a first electrode of the first pixel transistor based on the first gate signal, a third pixel transistor configured to electrically connect a second electrode and a gate electrode of the first pixel transistor based on a second gate signal among the plurality of gate signals, a fourth pixel transistor configured to supply an initialization voltage to the gate electrode of the first pixel transistor based on a third gate signal among the plurality of gate signals, and a fifth pixel transistor configured to supply a driving voltage to the first electrode of the first pixel transistor based on a light-emitting signal.

In an embodiment, the display device further includes a first node electrode disposed in the second gate layer and corresponding to the first node, a second gate line, among the plurality of gate lines, disposed in the third gate layer and configured to supply the second gate signal, and a light emitting line disposed in the third gate layer and configured to supply the light-emitting signal.

In an embodiment, the display device further includes a first node electrode disposed in the second source metal layer and corresponding to the first node, a second gate line, among the plurality of gate lines, disposed in the second gate layer and configured to supply the second gate signal, and a light emitting line disposed in the third gate layer and configured to supply the light-emitting signal.

According to an embodiment of the present disclosure, an electronic device includes a display device and a power supply configured to provide power to the display device. The display device includes a display panel including a plurality of data lines to which a plurality of data voltages are applied, a plurality of gate lines intersecting the plurality of data lines, and a plurality of pixels connected to the data lines and the gate lines, where a gate signal is applied to each of the gate lines, a data driver configured to supply the data voltages to the data lines, and a scan driver configured to sequentially supply the gate signals to the gate lines. The scan driver includes first to third stages including one sharing circuit and a plurality of buffer circuits configured to sequentially output a plurality of scan signals. The sharing circuit includes a first transistor configured to supply a start signal to a first node based on a first clock signal among a plurality of clock signals received from a first clock line among a plurality of clock lines, a second transistor configured to supply the first clock signal to a second node based on a voltage of the first node, and a third transistor configured to supply a gate low voltage to the second node based on the first clock signal. Each of the plurality of buffer circuits is directly connected to the first node and the second node and is configured to output a first gate signal among the plurality of gate signals to a first gate line among the plurality of gate lines.

With a display device according to an embodiment, as the stages within a unit stage share some transistors, the number of transistors in the gate driver may be reduced, thereby reducing the area of the non-display area and reducing power consumption.

BRIEF DESCRIPTION OF THE DRAWINGS

The above and other features of the present disclosure will become more apparent by describing in detail embodiments thereof, with reference to the accompanying drawings, in which.

DETAILED DESCRIPTION OF THE EMBODIMENTS

Figure 1:
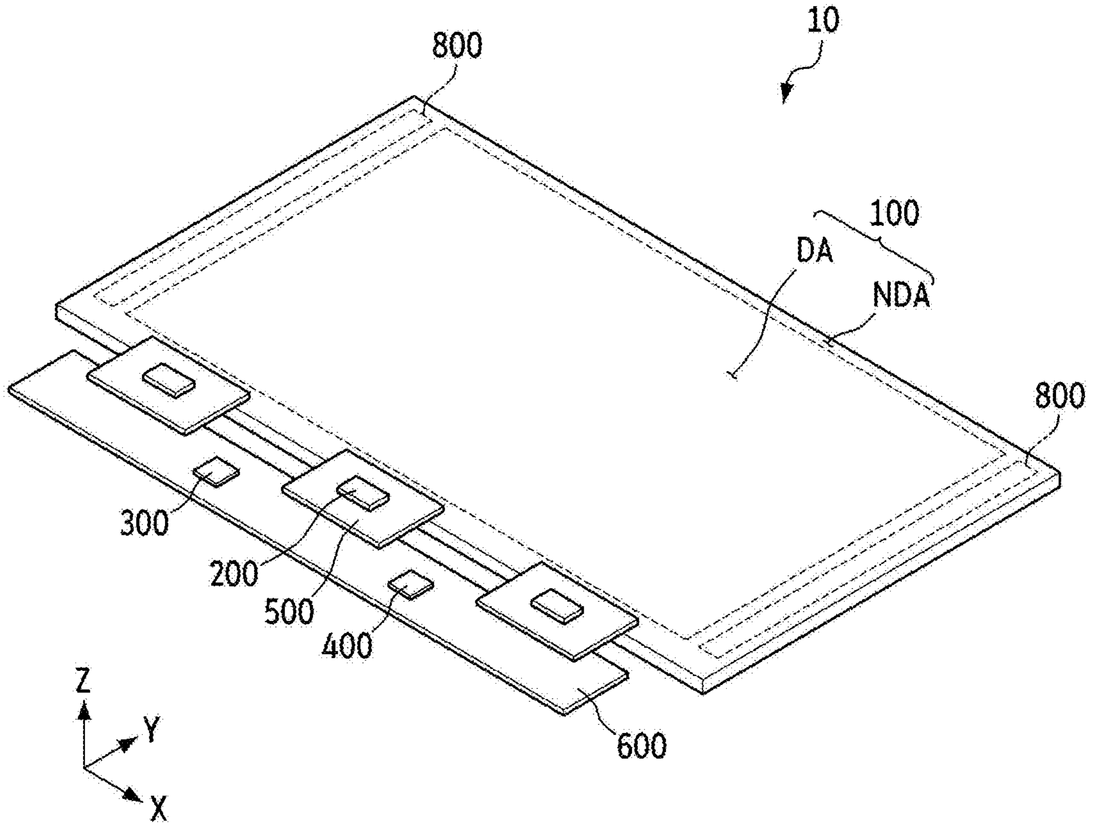
FIG. 1 is a perspective view illustrating a display device according to an embodiment.

Embodiments of the present disclosure will be described more fully hereinafter with reference to the accompanying drawings. Like reference numerals may refer to like elements throughout the specification and the accompanying drawings.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationship between components should be interpreted in a like fashion.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each embodiment are available for other similar features or aspects in other embodiments, unless the context clearly indicates otherwise. Accordingly, all features and structures described herein may be mixed and matched in any desirable manner.

As used herein, the singular forms "a", "an" and "the" are intended to include the plural forms as well, unless the context clearly indicates otherwise.

It will be understood that the terms "first," "second," "third," etc. are used herein to distinguish one element from another, and the elements are not limited by these terms. Thus, a "first" element in an embodiment may be described as a "second" element in another embodiment.

When a feature is said to extend, protrude, or otherwise follow a certain direction, it will be understood that the feature may follow said direction in the negative, i.e., opposite direction. Accordingly, the feature is not limited to follow exactly one direction, and may follow along an axis formed by the direction, unless the context clearly indicates otherwise.

FIG. 1 is a perspective view illustrating a display device according to an embodiment.

Referring to FIG. 1, a display device 10 is a device that displays a moving image (e.g., video) or a still image, and may be used as a display screen in various electronic products such as, for example, a television, a laptop computer, a monitor, a billboard, and an Internet of Things (IoT) device, as well as portable electronic devices such as, for example, a mobile phone, a smartphone, a tablet personal computer (PC), a smartwatch, a watch phone, a mobile communication terminal, an electronic organizer, an electronic book, a portable multimedia player (PMP), a navigation device, and an ultra mobile PC (UMPC).

The display device 10 may include a display panel 100, a data driver 200 (also referred to as a data driver circuit), a timing controller 300 (also referred to as a timing controller circuit), a power supply unit 400 (also referred to as a power supply circuit), a data circuit board 500, a control circuit board 600, and a scan driver 800 (also referred to as a scan driver circuit).

The display panel 100 may have a rectangular planar surface with a relatively long side in an X-axis direction and a relatively short side in a Y-axis direction that intersects the X-axis direction. A corner where the long side in the X-axis direction and the short side in the Y-axis direction meet may be rounded to have a predetermined curvature or may be formed at a right angle. The planar shape of the display panel 100 is not limited to the quadrangular shape, and may be formed in, for example, other polygonal shapes, a circular shape, or an elliptical shape. The display panel 100 may be formed to be flat, but is not limited thereto. For example, the display panel 100 may include curved surface portions formed at left and right distal ends thereof and having a constant curvature or a variable curvature. The display panel 100 may be flexibly formed to be curved, bent, folded, or rolled.

The display panel 100 may include a display area DA in which an image is displayed and a non-display area NDA disposed around the display area DA in which an image is not displayed. The display area DA may occupy most of an area of the display panel 100. The display area DA may be disposed at or near a center of the display panel 100. The display area DA may include a plurality of pixels that display an image.

Each of the plurality of pixels may include a light-emitting element that emits light. The light-emitting element may include at least one of an organic light-emitting diode including an organic light-emitting layer, a quantum dot light-emitting diode including a quantum dot light-emitting layer, an inorganic light-emitting diode including an inorganic semiconductor, and a micro light-emitting diode (micro LED), but is not limited thereto.

The non-display area NDA may be disposed adjacent to the display area DA. The non-display area NDA may be an area outside the display area DA. The non-display area NDA may surround the display area DA. The non-display area NDA may be an edge area of the display panel 100.

The non-display area NDA may include a scan driver 800, a fan-out line, and a pad portion. The scan driver 800 may supply a scan signal to a gate line of the display area DA. The scan driver 800 may be disposed on the left and right edges of the non-display area NDA, but is not limited thereto. The fan-out line may electrically connect the data driver 200 and a data line of the display area DA. The pad portion may be electrically connected to the data circuit board 500. The pad portion may be disposed at a lower edge of the display panel 100, but is not limited thereto.

The data driver 200 may output signals and voltages that drive the display panel 100. The data driver 200 may supply a data voltage to the data line. The data driver 200 may supply a power voltage to a power line and may supply a scan control signal to the scan driver 800. In an embodiment, the data driver 200 may be formed as an integrated circuit (IC) and mounted on the data circuit board 500 in a chip on film (COF) method. In an embodiment, the data driver 200 may be mounted in the non-display area NDA of the display panel 100 using, for example, a chip on glass (COG) method, a chip on plastic (COP) method, or an ultrasonic bonding method.

The timing controller 300 may be mounted on the control circuit board 600 and may receive digital video data and timing synchronization signals supplied from a display driving system or a graphics device through a connector provided on the control circuit board 600. The timing controller 300 may align the digital video data to fit a pixel arrangement structure based on the timing synchronization signal, and may supply the aligned digital video data to the data driver 200. The timing controller 300 may generate a data control signal and a scan control signal based on the timing synchronization signal. The timing controller 300 may control a supply timing of the data voltage of the data driver 200 based on the data control signal, and control a supply timing of the scan signal of the scan driver 800 based on the scan control signal.

The power supply unit 400 may be mounted on the control circuit board 600, and may supply a power voltage to the display panel 100 and the data driver 200. For example, the power supply unit 400 may generate a driving voltage, a common voltage, an initialization voltage, a bias voltage, a gate high voltage, a gate low voltage, or a reference voltage. The power supply unit 400 may drive the plurality of pixels and the data driver 200 by supplying the power voltage.

The data circuit board 500 may be disposed on the pad portion disposed at one edge of the display panel 100. The data circuit board 500 may be attached to the pad portion using a conductive adhesive member such as an anisotropic conductive film. The data circuit board 500 may be electrically connected to signal lines of the display panel 100 through the anisotropic conductive film. The display panel 100 may receive the data voltage and the power voltage through the data circuit board 500. For example, the data circuit board 500 may be a flexible film such as a flexible printed circuit board, a printed circuit board, or a chip on film.

The control circuit board 600 may be attached to the data circuit board 500 using a low-resistance and high-reliability material such as an anisotropic conductive film or self-assembly anisotropic conductive paste (SAP). The control circuit board 600 may be electrically connected to the data circuit board 500. The control circuit board 600 may be a flexible printed circuit board or a printed circuit board.

Figure 2:
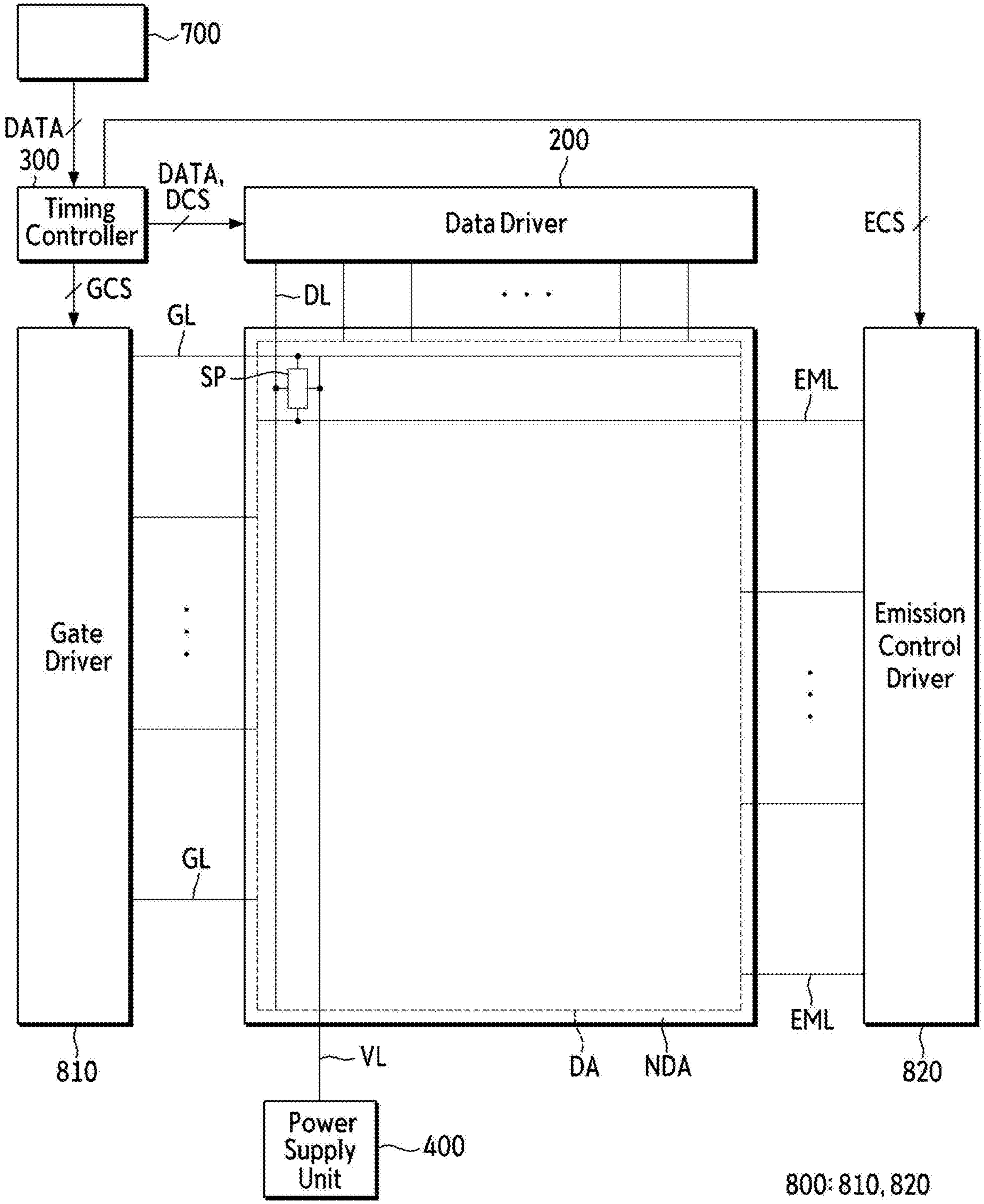
FIG. 2 is a block diagram illustrating a display device according to an embodiment.

FIG. 2 is a block diagram illustrating the display device according to an embodiment.

Referring to FIG. 2, the display panel 100 may include a display area DA and a non-display area NDA. The display area DA may include a plurality of pixels SP, a plurality of gate lines GL, a plurality of light-emitting control lines EML, a plurality of data lines DL, and a plurality of voltage lines VL.

Each of the plurality of pixels SP may be connected to the gate line GL, the data line DL, the light-emitting control line EML, and the voltage line VL. Each of the plurality of pixels SP may include at least one transistor, a light-emitting element, and a capacitor.

The gate lines GL may extend in the X-axis direction and may be spaced apart from each other in the Y-axis direction that intersects the X-axis direction. The gate lines GL may sequentially supply a gate signal to the plurality of pixels SP.

The light-emitting control lines EML may extend in the X-axis direction and may be spaced apart from each other in the Y-axis direction. The light-emitting control lines EML may sequentially supply a light-emitting signal to the plurality of pixels SP.

The data lines DL may extend in the Y-axis direction and may be spaced apart from each other in the X-axis direction. The data lines DL may supply the data voltage received from the data driver 200 to the pixels SP. The data voltage may determine a luminance of each of the pixels SP.

The voltage lines VL may extend in the Y-axis direction and may be spaced apart from each other in the X-axis direction. The voltage lines VL may supply the power voltage to the plurality of pixels SP. The power voltage may include at least one of, for example, a driving voltage, a common voltage, an initialization voltage, a bias voltage, a gate high voltage, a gate low voltage, and a reference voltage. For example, the driving voltage may be a high potential voltage that drives the light-emitting element of the pixel SP, and the common voltage may be a low potential voltage that drives the light-emitting element of the pixel SP.

The data driver 200 may convert digital video data DATA into analog data voltages and supply the analog data voltages to the data lines DL. The gate signals of the gate driver 810 may select the pixels SP to which the data voltage is supplied, and the selected pixels SP may receive the data voltage through the data lines DL.

The timing controller 300 may receive the digital video data DATA and timing signals from a graphics device 700. For example, the graphics device 700 may be a graphics card of the display device 10, but is not limited thereto. The timing controller 300 may generate a data control signal DCS based on the timing signals and supply the digital video data DATA and the data control signal DCS to the data driver 200, thereby controlling an operation timing of the data driver 200. The timing controller 300 may generate a gate control signal based on the timing signals and supply the gate control signal GCS to the gate driver 810, thereby controlling an operation timing of the gate driver 810. The timing controller 300 may generate a light-emitting control signal ECS based on the timing signals and supply the light-emitting control signal ECS to a light-emitting control driver 820, thereby controlling an operation timing of the light-emitting control driver 820. The timing controller 300 may vary a driving frequency of the display panel 100 based on an input frequency of the digital video data DATA of the graphics device 700.

The power supply unit 400 may be disposed on the data circuit board 500 and may supply the power voltage to the data driver 200 and the display panel 100. The power supply unit 400 may generate a driving voltage and supply the driving voltage to the driving voltage line, and may generate a common voltage and supply the common voltage to a common electrode common to the light-emitting elements of the pixel. The power supply unit 400 may generate an initialization voltage and supply the initialization voltage to an initialization voltage line, and may generate a bias voltage and supply the bias voltage to a bias voltage line. The power supply unit 400 may generate a gate high voltage and supply the gate high voltage to a gate high voltage line, may generate a gate low voltage and supply the gate low voltage to a gate low voltage line, and may generate a reference voltage and supply the reference voltage to a reference voltage line.

In an embodiment, the gate driver 810 may be disposed outside of one side of the display area DA or on one side of the non-display area NDA, and the light-emitting control driver 820 may be disposed outside of the other side of the display area DA or on the other side of the non-display area NDA, but the present disclosure is not limited thereto. In an embodiment, the gate driver 810 and the light-emitting control driver 820 may be disposed on either one side or the other side of the non-display area NDA.

The gate driver 810 may include a plurality of transistors that generate a gate signal based on a gate control signal GCS. The light-emitting control driver 820 may include a plurality of transistors that generate a light-emitting signal based on a light-emitting control signal ECS. For example, the transistors of the gate driver 810 and the transistors of the light-emitting control driver 820 may be formed on the same layer as the transistors of each of the pixels SP. The gate driver 810 may supply the gate signal to the gate line GL, and the light-emitting control driver 820 may supply the light-emitting signal to the light-emitting control line EML.

Figure 3:
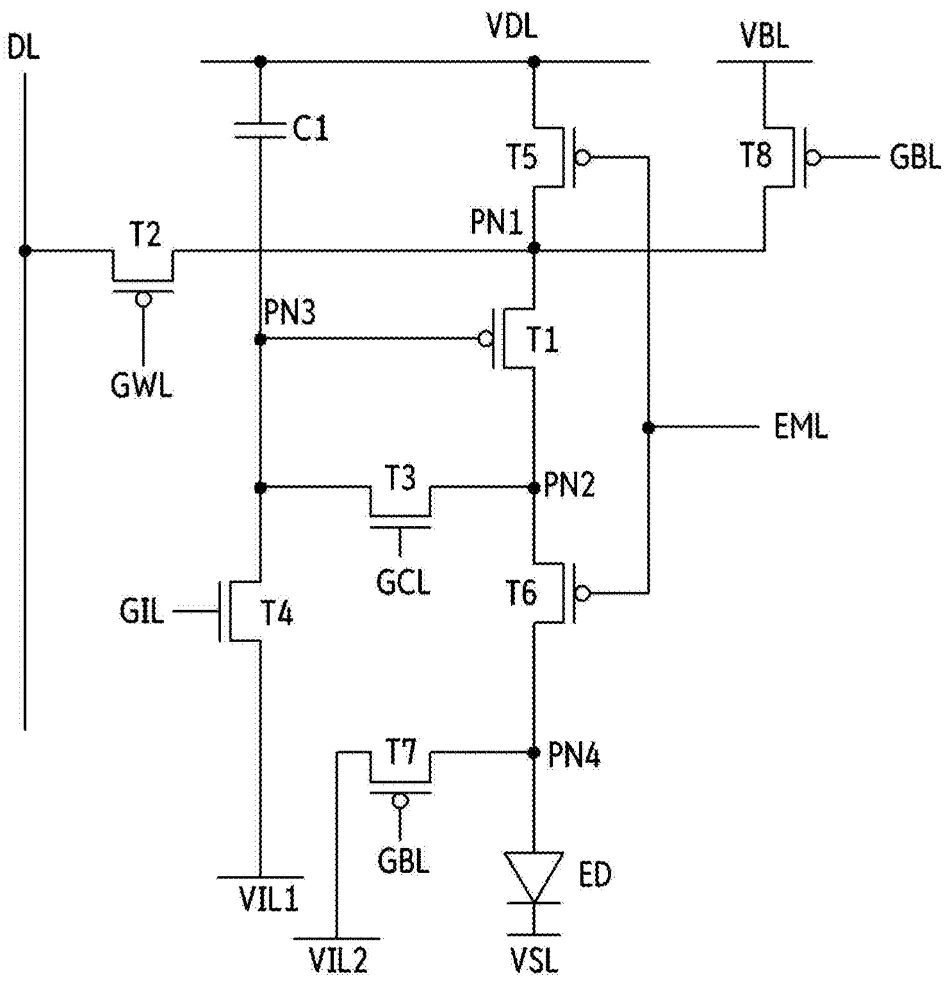
FIG. 3 is a circuit diagram illustrating a pixel of a display device according to an embodiment.

FIG. 3 is a circuit diagram illustrating a pixel of the display device according to an embodiment.

Referring to FIG. 3, the display panel 100 may include a plurality of pixels SP arranged along a plurality of rows and columns. Each of the plurality of pixels SP may be connected to a first gate line GWL, a second gate line GCL, a third gate line GIL, a fourth gate line GBL, a light-emitting control line EML, a data line DL, a driving voltage line VDL, a first initialization voltage line VIL1, a second initialization voltage line VIL2, a bias voltage line VBL, and a low potential line VSL.

The pixel SP may include a light-emitting element ED and a pixel circuit that drives the light-emitting element ED. The pixel circuit may include first to eighth transistors T1, T2, T3, T4, T5, T6, T7, and T8 and a capacitor C1.

The first transistor T1 may control a driving current supplied to the light-emitting element ED. The first transistor T1 may include a gate electrode, a first electrode, and a second electrode. The gate electrode of the first transistor T1 may be connected to a third node N3, the first electrode of the first transistor T1 may be connected to a first pixel node PN1, and the second electrode of the first transistor T1 may be connected to a second pixel node PN2. For example, the first electrode of the first transistor T1 may be a source electrode, and the second electrode thereof may be a drain electrode, but are not limited thereto.

The first transistor T1 may control a source-drain current Isd (hereinafter referred to as a "driving current") according to a data voltage applied to the gate electrode thereof. The driving current Isd flowing through a channel of the first transistor T1 may be proportional to a square of a difference between a voltage Vsg between the source electrode and the gate electrode of the first transistor T1 and a threshold voltage Vth ($Isd=k\times(Vsg-Vth)^2$). Here, k is a proportional coefficient determined by a structure and physical characteristics of the first transistor T1, Vsg is a source-gate voltage of the first transistor T1, and Vth is a threshold voltage of the first transistor T1.

The light-emitting element ED may emit light by receiving the driving current Isd. The amount of light emitted from or luminance of the light-emitting element ED may be proportional to the magnitude of the driving current Isd. The light-emitting element ED may include a first electrode, a second electrode, and a light emitting layer disposed between the first electrode and the second electrode. The first electrode of the light-emitting element ED may be connected to a fourth pixel node PN4. The first electrode of the light-emitting element ED may be electrically connected to a second electrode of the sixth transistor T6 and a first electrode of the seventh transistor T7 through the fourth pixel node PN4. The second electrode of the light-emitting element ED may be electrically connected to the low potential line VSL and may receive a low potential voltage from the low potential line VSL. For example, the first electrode of the light-emitting element ED may be an anode electrode or a pixel electrode, and the second electrode thereof may be a cathode electrode or a common electrode, but are not limited thereto.

The second transistor T2 may be turned on by a first gate signal of the first gate line GWL and electrically connect the data line DL and the first pixel node PN1, which is the first electrode of the first transistor T1. The first gate line GWL may correspond to a scan write line. The second transistor T2 may be turned on based on the first gate signal, thereby supplying the data voltage to the first pixel node PN1. A gate electrode of the second transistor T2 may be connected to the first gate line GWL, a first electrode thereof may be connected to the data line DL, and a second electrode thereof may be connected to the first pixel node PN1. The second electrode of the second transistor T2 may be electrically connected to the first electrode of the first transistor T1, a second electrode of the fifth transistor T5, and a second electrode of the eighth transistor T8 through the first pixel node PN1. For example, the first electrode of the second transistor T2 may be a source electrode, and the second electrode thereof may be a drain electrode, but are not limited thereto.

The third transistor T3 may be turned on by a second gate signal of the second gate line GCL and may electrically connect the second pixel node PN2, which is the second electrode of the first transistor T1, and the third pixel node PN3, which is the gate electrode of the first transistor T1. A gate electrode of the third transistor T3 may be connected to the second gate line GCL, a first electrode thereof may be connected to the second pixel node PN2, and a second electrode thereof may be connected to the third pixel node PN3. The first electrode of the third transistor T3 may be electrically connected to the second electrode of the first transistor T1 and the first electrode of the sixth transistor T6 through the second pixel node PN2. The second electrode of the third transistor T3 may be electrically connected to the gate electrode of the first transistor T1, a first electrode of the fourth transistor T4, and a first capacitor electrode of the capacitor C1 through the third pixel node PN3. For example, the first electrode of the third transistor T3 may be a drain electrode, and the second electrode thereof may be a source electrode, but are not limited thereto.

The fourth transistor T4 may be turned on by a third gate signal of the third gate line GIL and may electrically connect the third pixel node PN3, which is the gate electrode of the first transistor T1, and the first initialization voltage line VIL1. The fourth transistor T4 may be turned on based on the third gate signal, thereby initializing the gate electrode of the first transistor T1 to the first initialization voltage. A gate electrode of the fourth transistor T4 may be connected to the third gate line GIL, a first electrode thereof may be connected to the third pixel node PN3, and a second electrode thereof may be connected to the first initialization voltage line VIL1. The first electrode of the fourth transistor T4 may be electrically connected to the gate electrode of the first transistor T1, the second electrode of the third transistor T3, and the first capacitor electrode of the capacitor C1 through the third pixel node PN3. For example, the first electrode of the fourth transistor T4 may be a drain electrode, and the second electrode thereof may be a source electrode, but are not limited thereto.

The fifth transistor T5 may be turned on by the light-emitting signal of the light-emitting control line EML and may electrically connect the driving voltage line VDL and the first pixel node PN1, which is the first electrode of the first transistor T1. A gate electrode of the fifth transistor T5 may be connected to the light-emitting control line EML, a first electrode thereof may be connected to the driving voltage line VDL, and a second electrode thereof may be connected to the first pixel node PN1. The second electrode of the fifth transistor T5 may be electrically connected to the first electrode of the first transistor T1, the second electrode of the second transistor T2, and the second electrode of the eighth transistor T8 through the first pixel node PN1. For example, the first electrode of the fifth transistor T5 may be a source electrode, and the second electrode thereof may be a drain electrode, but are not limited thereto.

The sixth transistor T6 may be turned on by the light-emitting signal of the light-emitting control line EML and may electrically connect the second pixel node PN2, which is the second electrode of the first transistor T1, and the fourth pixel node PN4, which is the first electrode of the light-emitting element ED. A gate electrode of the sixth transistor T6 may be connected to the light-emitting control line EML, a first electrode thereof may be connected to the second pixel node PN2, and a second electrode thereof may be connected to the fourth pixel node PN4. The first electrode of the sixth transistor T6 may be electrically connected to the second electrode of the first transistor T1 and the first electrode of the third transistor T3 through the second pixel node PN2. The second electrode of the sixth transistor T6 may be electrically connected to the first electrode of the light-emitting element ED and the first electrode of the seventh transistor T7 through the fourth pixel node PN4. For example, the first electrode of the sixth transistor T6 may be a source electrode, and the second electrode thereof may be a drain electrode, but are not limited thereto.

When the fifth transistor T5, the first transistor T1, and the sixth transistor T6 are all turned on, the driving current Isd may be supplied to the light-emitting element ED.

The seventh transistor T7 may be turned on by a fourth gate signal of the fourth gate line GBL and may electrically connect the second initialization voltage line VIL2 and the fourth pixel node PN4, which is the first electrode of the light-emitting element ED. The seventh transistor T7 may be turned on based on the fourth gate signal, thereby initializing the first electrode of the light-emitting element ED to the second initialization voltage. Here, the second initialization voltage of the second initialization voltage line VIL2 may be different from the first initialization voltage of the first initialization voltage line VILL. In an embodiment, the second initialization voltage may be the same as the first initialization voltage. A gate electrode of the seventh transistor T7 may be connected to the fourth gate line GBL, a first electrode thereof may be connected to the fourth pixel node PN4, and a second electrode thereof may be connected to the second initialization voltage line VIL2. The first electrode of the seventh transistor T7 may be electrically connected to the first electrode of the light-emitting element ED and the second electrode of the sixth transistor T6 through the fourth pixel node PN4. For example, the first electrode of the seventh transistor T7 may be a source electrode, and the second electrode thereof may be a drain electrode, but are not limited thereto.

The eighth transistor T8 may be turned on by the fourth gate signal of the fourth gate line GBL and electrically connect the bias voltage line VBL and the first pixel node PN1, which is the first electrode of the first transistor T1. A gate electrode of the eighth transistor T8 may be connected to the fourth gate line GBL, a first electrode thereof may be connected to the bias voltage line VBL, and a second electrode thereof may be connected to the first pixel node PN1. The second electrode of the eighth transistor T8 may be electrically connected to the first electrode of the first transistor T1, the second electrode of the second transistor T2, and the second electrode of the fifth transistor T5 through the first pixel node PN1. For example, the first electrode of the eighth transistor T8 may be a source electrode, and the second electrode thereof may be a drain electrode, but are not limited thereto. In an embodiment, the eighth transistor T8 may be omitted.

The first transistor T1, the second transistor T2, the fifth transistor T5, the sixth transistor T6, the seventh transistor T7, and the eighth transistor T8 may include a silicon-based semiconductor area. For example, the first transistor T1, the second transistor T2, the fifth transistor T5, the sixth transistor T6, the seventh transistor T7, and the eighth transistor T8 may include a semiconductor area made of low temperature polycrystalline silicon (LTPS). The semiconductor area made of low temperature polycrystalline silicon may have high electron mobility and excellent turn-on characteristics. Therefore, in an embodiment, the display device 10 includes the first transistor T1, the second transistor T2, the fifth transistor T5, the sixth transistor T6, the seventh transistor T7, and the eighth transistor T8 having excellent turn-on characteristics, thereby stably and efficiently driving the plurality of pixels SP.

The first transistor T1, the second transistor T2, the fifth transistor T5, the sixth transistor T6, the seventh transistor T7, and the eighth transistor T8 may be p-type transistors. For example, the first transistor T1, the second transistor T2, the fifth transistor T5, the sixth transistor T6, the seventh transistor T7, and the eighth transistor T8 may output a current flowing into the first electrode thereof to the second electrode thereof based on a gate low voltage applied to the gate electrode thereof.

The third transistor T3 and fourth transistor T4 may include an oxide-based semiconductor area. For example, the third transistor T3 and fourth transistor T4 may have a coplanar structure in which the gate electrode is disposed above the oxide-based semiconductor area. A transistor with a coplanar structure may have excellent leakage current characteristics and may be driven at low frequencies, thereby reducing power consumption. Therefore, in an embodiment, the display device 10 includes the third transistor T3 and fourth transistor T4 having excellent leakage current characteristics, thereby preventing leakage current from flowing inside the pixel and stably keeping the voltage inside the pixel.

The third transistor T3 and fourth transistor T4 may be n-type transistors. For example, the third transistor T3 and the fourth transistor T4 may output a current flowing into the first electrode thereof to the second electrode thereof based on a gate high voltage applied to the gate electrode thereof.

The capacitor C1 may be connected between the third pixel node PN3, which is the gate electrode of the first transistor T1, and the driving voltage line VDL. For example, the first capacitor electrode of the capacitor C1 may be connected to the third pixel node PN3, and the second capacitor electrode of the capacitor C1 may be connected to the driving voltage line VDL, thereby maintaining a potential difference between the driving voltage line VDL and the gate electrode of the first transistor T1.

Figure 4:
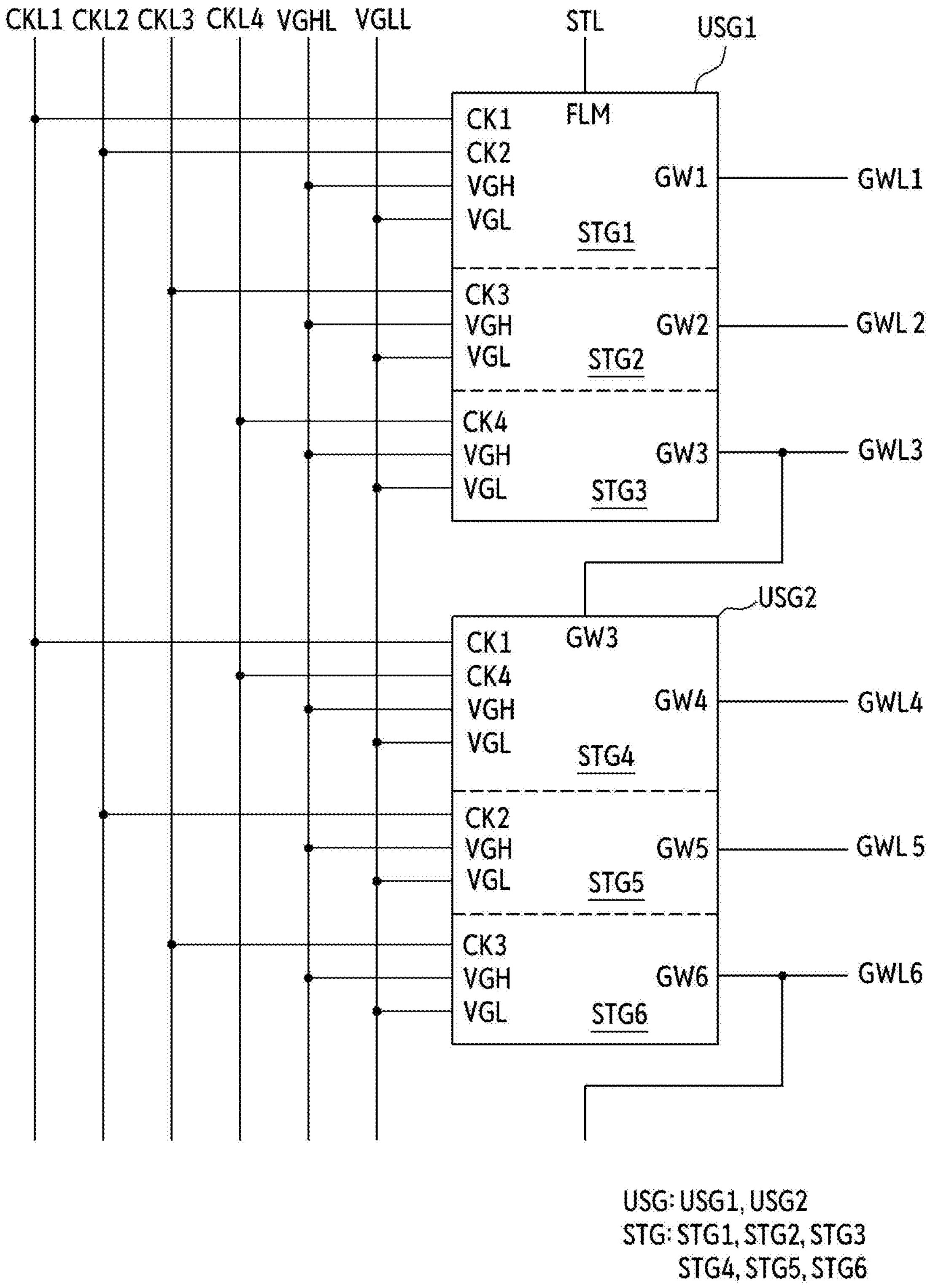
FIG. 4 is a block diagram illustrating a scan driver of a display device according to an embodiment.

FIG. 4 is a block diagram illustrating a scan driver of the display device according to an embodiment, Referring to FIG. 4, first to fourth clock lines CKL1, CKL2, CKL3, and CKL4 may supply first to fourth clock signals CK1, CK2, CK3, and CK4 to a plurality of stages STG. A gate high voltage line VGHL may supply a gate high voltage VGH to the stages STG, and a gate low voltage line VGLL may supply a gate low voltage VGL to the stages STG.

The gate driver 810 may include a plurality of unit stages USG. As the stages STG within the unit stage USG share some transistors, the number of transistors of the gate driver 810 is reduced, thereby reducing an area of the non-display area NDA and reducing power consumption. In an embodiment, the stages STG may generate a scan write signal and supply it to the first gate line GWL or the scan write line of FIG. 3. In an embodiment, the stages STG may supply scan signals to the second to fourth gate lines GCL, GIL, and GBL of FIG. 3.

For example, in an embodiment, the gate driver 810 may include multiple unit stages USG. By sharing certain transistors among the stages STG within each unit stage, the transistor count within the gate driver 810 is lowered, which may reduce the space required in the non-display area NDA and decrease power consumption. The stages STG are configured to generate a scan write signal, which can be supplied to the first gate line GWL or the scan write line, as shown in FIG. 3. Additionally, the stages STG may provide scan signals to the second, third, and fourth gate lines GCL, GIL, and GBL, illustrated in FIG. 3.

The unit stage USG may include first and second unit stages USG1 and USG2.

The first unit stage USG1 may include first to third stages STG1, STG2, and STG3, but the number of stages STG in the unit stage USG is not limited thereto.

The first stage STG1 may be connected to a start line STL and may receive a start signal FLM. The first stage STG1 may receive the first and second clock signals CK1 and CK2, the gate high voltage VGH, and the gate low voltage VGL, and supply a first scan write signal GW1 to a first scan write line GWL1.

The second stage STG2 may receive the third clock signal CK3, the gate high voltage VGH, and the gate low voltage VGL, and supply a second scan write signal GW2 to a second scan write line GWL2.

The third stage STG3 may receive the fourth clock signal CK4, the gate high voltage VGH, and the gate low voltage VGL, and supply a third scan write signal GW3 to a third scan write line GWL3.

The second unit stage USG2 may include fourth to sixth stages STG4, STG5, and STG6.

The fourth stage STG4 may receive the third scan write signal GW3 of the third stage STG3 as a carry signal. The fourth stage STG4 may receive the first and fourth clock signals CK1 and CK4, the gate high voltage VGH, and the gate low voltage VGL, and supply a fourth scan write signal GW4 to a fourth scan write line GWL4.

The fifth stage STG5 may receive the second clock signal CK2, the gate high voltage VGH, and the gate low voltage VGL, and supply a fifth scan write signal GW5 to a fifth scan write line GWL5.

The sixth stage STG6 may receive the third clock signal CK3, the gate high voltage VGH, and the gate low voltage VGL, and supply a sixth scan write signal GW6 to a sixth scan write line GWL6.

Figure 5:
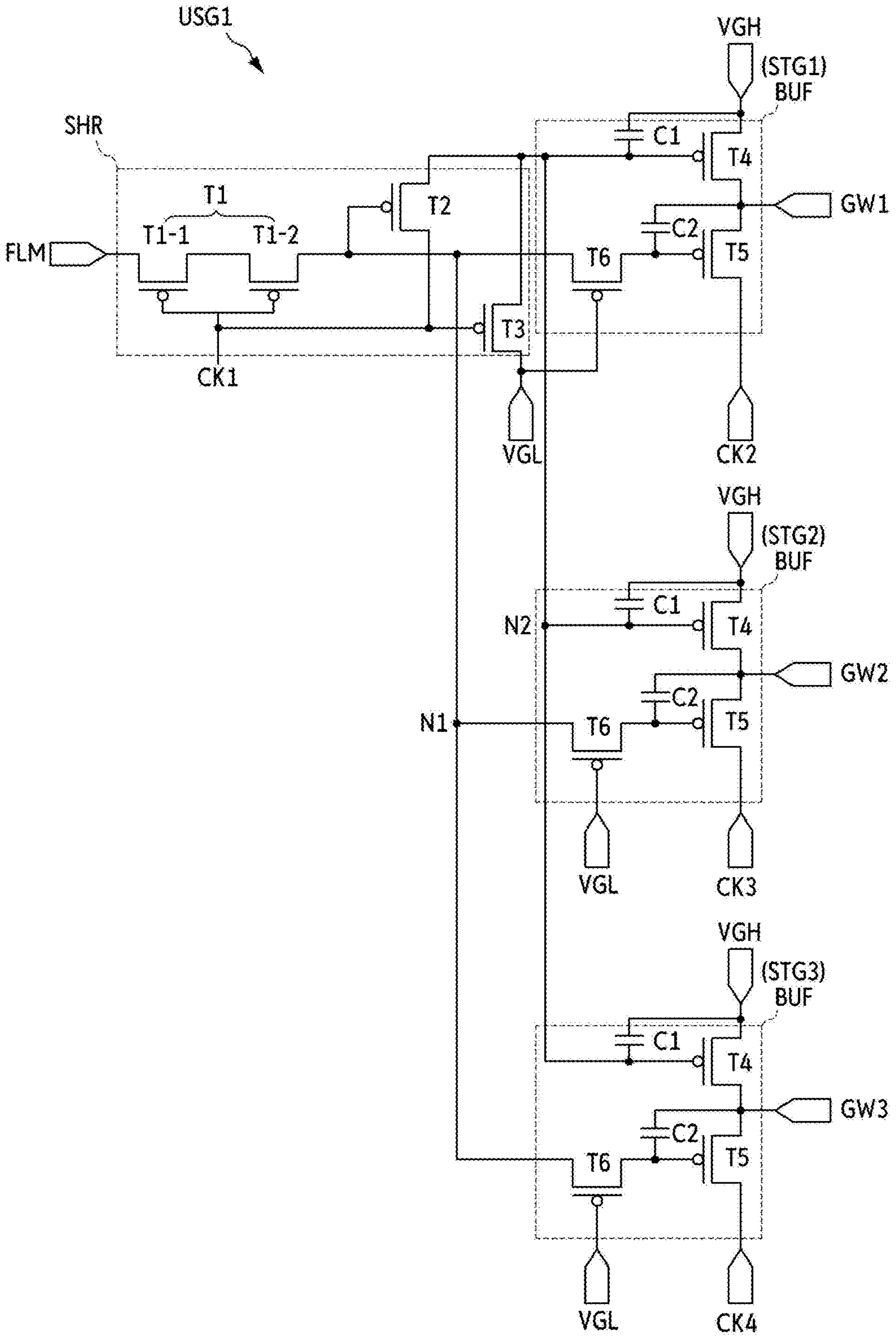
FIG. 5 is a circuit diagram illustrating a first unit stage of a scan driver in a display device according to an embodiment.

FIG. 5 is a circuit diagram illustrating a first unit stage of the scan driver in the display device according to an embodiment.

Referring to FIG. 5, the first unit stage USG1 may include first to third stages STG1, STG2, and STG3.

The first to third stages STG1, STG2, and STG3 may share a sharing unit SHR (also referred to as a sharing circuit) and may each include a buffer unit BUF (also referred to as a buffer circuit). Therefore, one unit stage USG may include one sharing unit SHR and a plurality of buffer units BUF. The sharing unit SHR is a buffer control unit that controls an output signal of the buffer unit BUF. Each unit stage may also be referred to as a unit stage circuit.

The sharing unit SHR may include first to third transistors T1, T2, and T3.

The first transistor T1 may supply the start signal FLM to a first node N1 based on the first clock signal CK1. The buffer unit BUF of each of the first to third stages STG1, STG2, and STG3 may be directly connected to the first node N1. The first transistor T1 may include a first sub-transistor T1-1 and a second sub-transistor T1-2 connected in series between an input terminal of the start signal FLM and the first node N1.

The second transistor T2 may supply the first clock signal CK1 to a second node N2 based on a voltage of the first node N1. The buffer unit BUF of each of the first to third stages STG1, STG2, and STG3 may be directly connected to the second node N2.

The third transistor T3 may supply the gate low voltage VGL to the second node N2 based on the first clock signal CK1.

The buffer unit BUF of each of the first to third stages STG1, STG2, and STG3 may include fourth to sixth transistors T4, T5, and T6 and first and second capacitors C1 and C2. The buffer unit BUF of each of the first to third stages STG1, STG2, and STG3 may output the first to third scan write signals GW1, GW2, and GW3 through an output node.

The fourth transistor T4 may supply the gate high voltage VGH to the output node based on a voltage of the second node N2.

The fifth transistor T5 of the first stage STG1 may supply the second clock signal CK2 to the output node based on a voltage of a second electrode of the sixth transistor T6. The fifth transistor T5 of the second stage STG2 may supply the third clock signal CK3 to the output node based on the voltage of a second electrode of the sixth transistor T6. The fifth transistor T5 of the third stage STG3 may supply the fourth clock signal CK4 to the output node based on the voltage of the second electrode of the sixth transistor T6.

The sixth transistor T6 may supply the voltage of the first node N1 to the gate electrode of the fifth transistor T5 based on the gate low voltage VGL.

A potential difference may be maintained between the second node N2 and an input terminal of the gate high voltage VGH by connecting the first capacitor C1 between the second node N2 and the input terminal of the gate high voltage VGH.

A potential difference may be maintained between an output terminal and the gate electrode of the fifth transistor T5 by connecting the second capacitor C2 between the output terminal and the gate electrode of the fifth transistor T5.

Therefore, according to embodiments of the present disclosure, as one unit stage USG includes one sharing unit SHR and the plurality of buffer units BUF, the number of transistors of the gate driver 810 is reduced. As a result, an area of the non-display area NDA and power consumption may be reduced.

Figure 6:
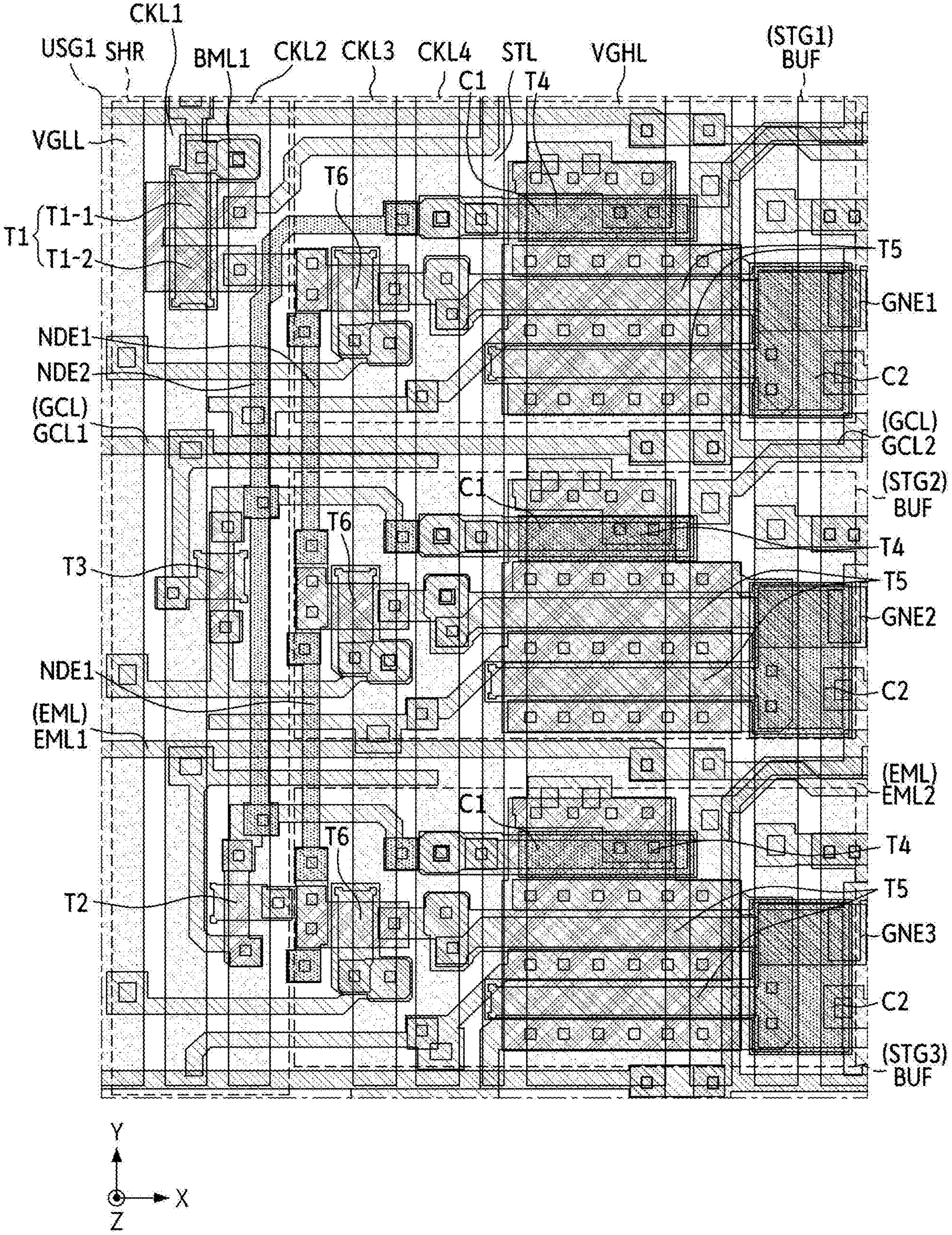
FIG. 6 is a layout diagram illustrating a first unit stage of a scan driver in a display device according to an embodiment.
Figure 7:
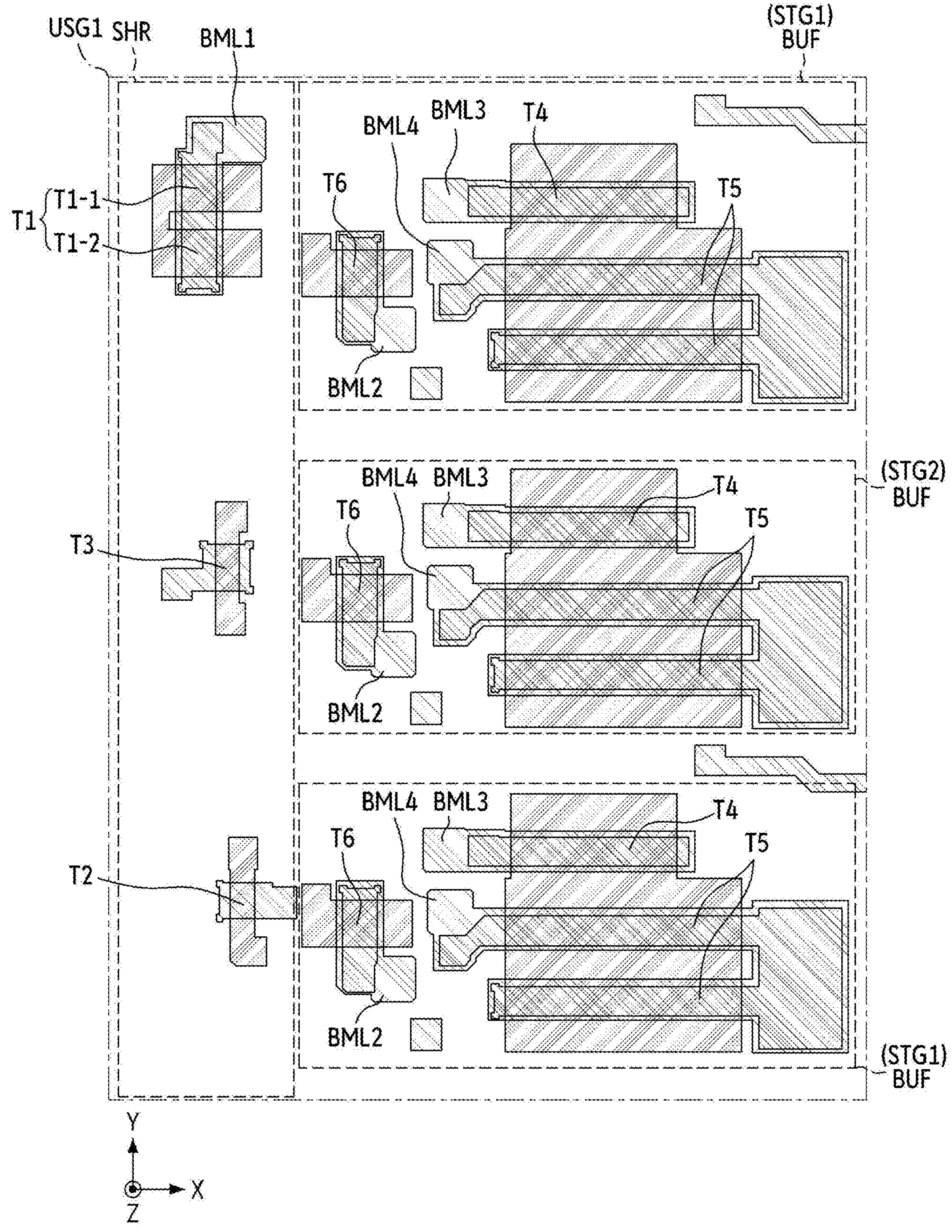
FIG. 7 is a layout diagram illustrating a metal layer, an active layer, and a first gate layer of the first unit stage in the display device of FIG. 6 according to an embodiment.
Figure 8:
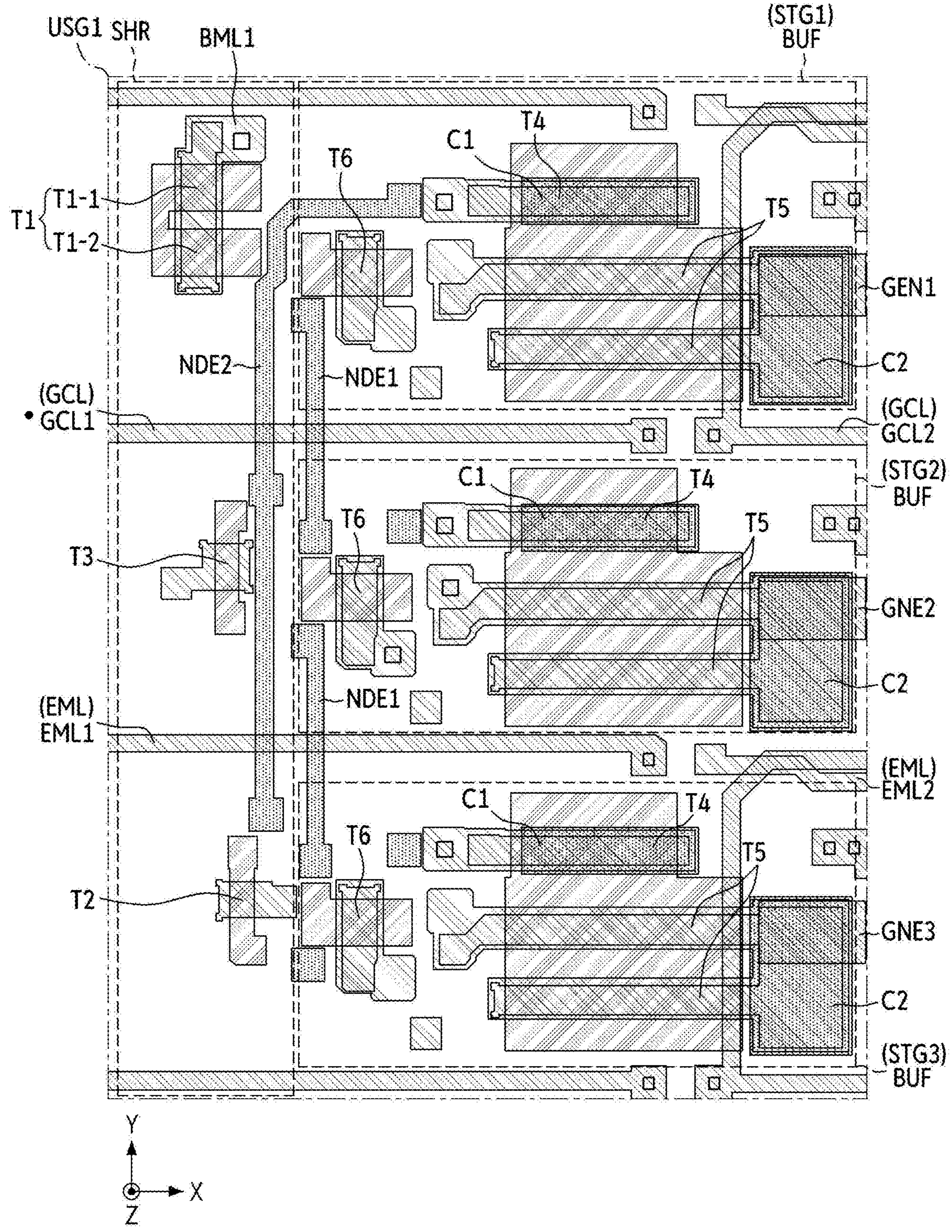
FIG. 8 is a layout diagram illustrating a metal layer, an active layer, a first gate layer, a second gate layer, and a third gate layer of the first unit stage in the display device of FIG. 6 according to an embodiment.
Figure 9:
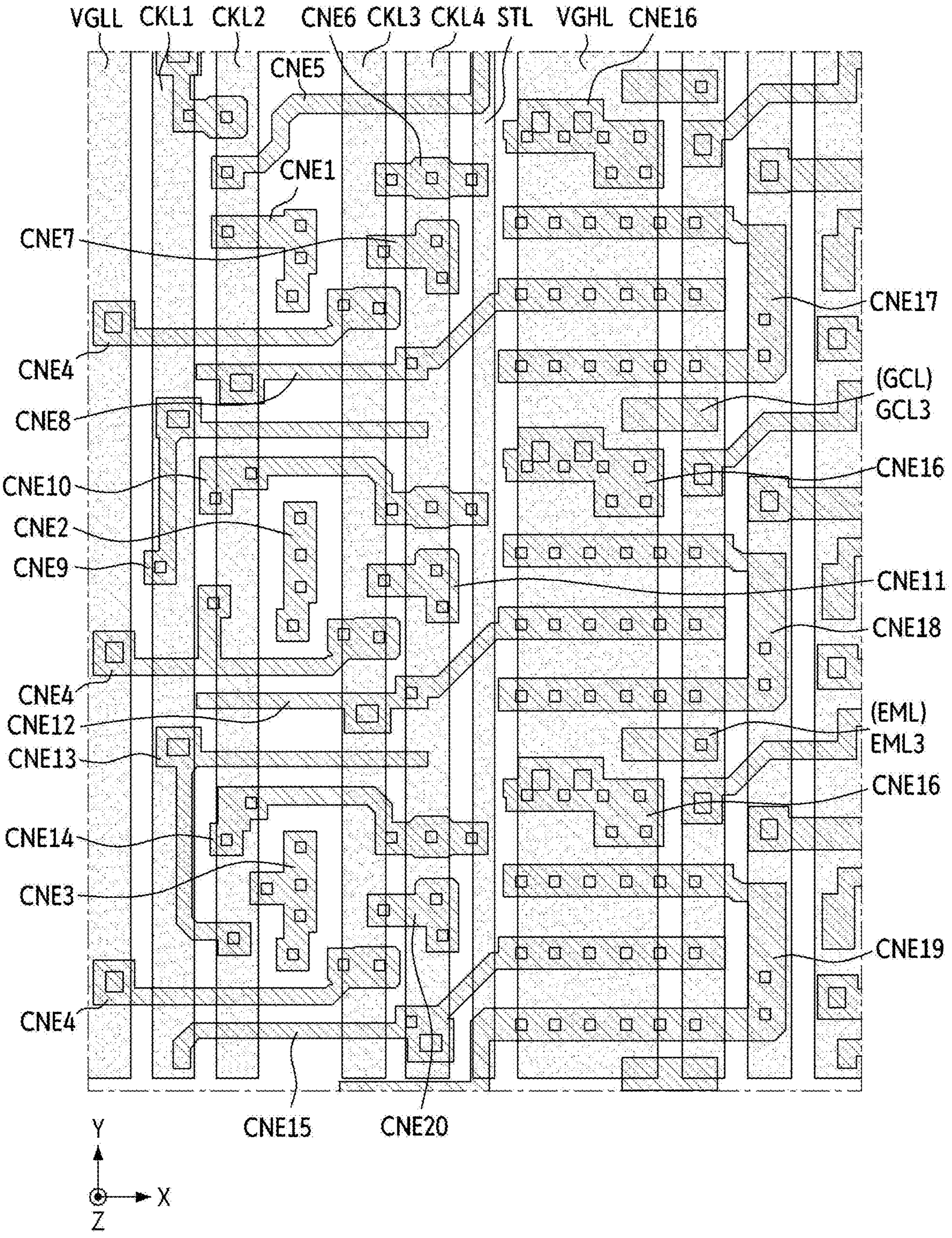
FIG. 9 is a layout diagram illustrating a first source metal layer and a second source metal layer of the first unit stage in the display device of FIG. 6 according to an embodiment.
Figure 10:
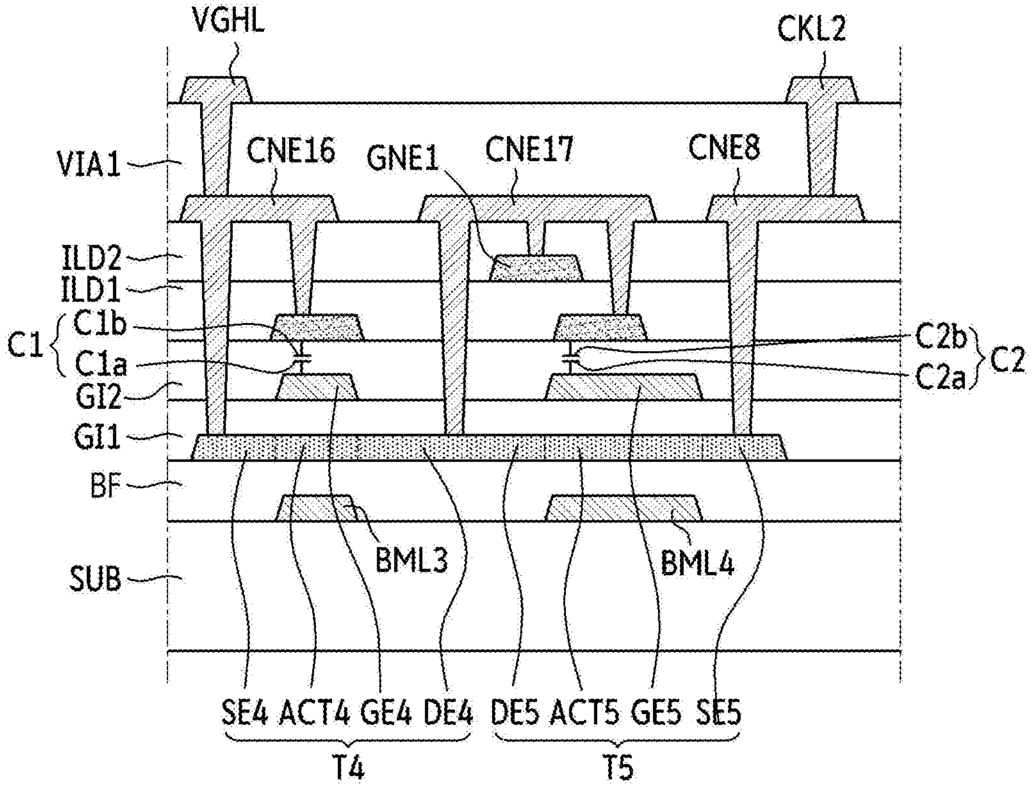
FIG. 10 is a cross-sectional view illustrating a portion of the first unit stage in the display device of FIG. 6 according to an embodiment.
Figure 11:
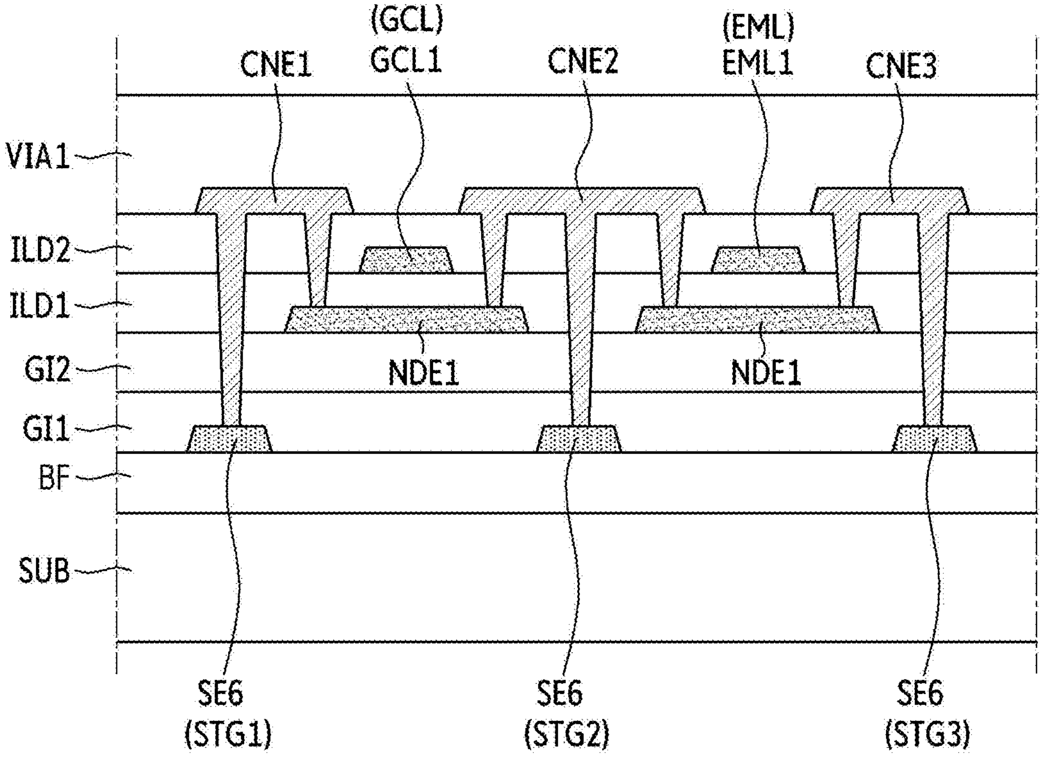
FIG. 11 is a cross-sectional view illustrating another portion of the first unit stage in the display device of FIG. 6 according to an embodiment.

FIG. 6 is a layout diagram illustrating the first unit stage of the scan driver in the display device according to an embodiment. FIG. 7 is a layout diagram illustrating a metal layer, an active layer, and a first gate layer of the first unit stage in the display device of FIG. 6 according to an embodiment. FIG. 8 is a layout diagram illustrating a metal layer, an active layer, a first gate layer, a second gate layer, and a third gate layer of the first unit stage in the display device of FIG. 6 according to an embodiment. FIG. 9 is a layout diagram illustrating a first source metal layer and a second source metal layer of the first unit stage in the display device of FIG. 6 according to an embodiment. FIG. 10 is a cross-sectional view illustrating a portion of the first unit stage in the display device of FIG. 6 according to an embodiment. FIG. 11 is a cross-sectional view illustrating another portion of the first unit stage in the display device of FIG. 6 according to an embodiment.

Referring to FIGS. 6 to 11, the first unit stage USG1 may include first to third stages STG1, STG2, and STG3. The first to third stages STG1, STG2, and STG3 may be connected to the first to fourth clock lines CKL1, CKL2, CKL3, and CKL4, the gate high voltage line VGHL, and the gate low voltage line VGLL.

The gate low voltage line VGLL may be disposed on a second source metal layer SDL2 and extend in the Y-axis direction. The first clock line CKL1 may be disposed to the right of the gate low voltage line VGLL in the second source metal layer SDL2 and extend in the Y-axis direction. The second clock line CKL2 may be disposed to the right of the first clock line CKL1 in the second source metal layer SDL2 and extend in the Y-axis direction. The third clock line CKL3 may be disposed to the right of the second clock line CKL2 in the second source metal layer SDL2 and extend in the Y-axis direction. The fourth clock line CKL4 may be disposed to the right of the third clock line CKL3 in the second source metal layer SDL2 and extend in the Y-axis direction. The gate high voltage line VGHL may be disposed to the right of the fourth clock line CKL4 in the second source metal layer SDL2 and extend in the Y-axis direction.

A plurality of first node electrodes NDE1 and first to third connection electrodes CNE1, CNE2, and CNE3 may be disposed between the second and third clock lines CKL2 and CKL3. The plurality of first node electrodes NDE1 and the first to third connection electrodes CNE1, CNE2, and CNE3 may be arranged in the Y-axis direction and electrically connected to each other. Here, the first node electrode NDE1 may correspond to the first node N1 in FIG. 5. Therefore, in an embodiment, the plurality of first node electrodes NDE1 and the first to third connection electrodes CNE1, CNE2, and CNE3 do not overlap the second source metal layer SDL2. As a result, coupling between the first node N1 and the second source metal layer SDL2 may be reduced.

The first to third stages STG1, STG2, and STG3 may share a sharing unit SHR and may each include a buffer unit BUF. The sharing unit SHR may include first to third transistors T1, T2, and T3. Each of the first to third transistors T1, T2, and T3 may be disposed in one area of the first to third stages STG1, STG2, and STG3. In FIGS. 6 to 8, the first transistor T1 may be disposed in the first stage STG1, the second transistor T2 may be disposed in the third stage STG3, and the third transistor T3 may be disposed in the second stage STG2, but the positions of the first to third transistors T1, T2, and T3 are not limited thereto. For example, in an embodiment, the first transistor T1 may be disposed in one of the first to third stages STG1, STG2, and STG3, the second transistor T2 may be disposed in another of the first to third stages STG1, STG2, and STG3, and the third transistor T3 may be disposed in the other of the first to third stages STG1, STG2, and STG3.

The first transistor T1 may include a first sub-transistor T1-1 and a second sub-transistor T1-2 connected in series. Each of the first sub-transistor T1-1 and the second sub-transistor T1-2 may include a semiconductor area, a gate electrode, a first electrode, and a second electrode. The semiconductor area, the first electrode, and the second electrode of each of the first sub-transistor T1-1 and the second sub-transistor T1-2 may be disposed in an active layer ACTL, and the gate electrode thereof may be disposed in a first gate layer GTL1. The gate electrode of each of the first sub-transistor T1-1 and the second sub-transistor T1-2 may overlap the semiconductor area. A first metal layer BML1 may be disposed in the metal layer BML and overlap the semiconductor areas of the first sub-transistor T1-1 and the second sub-transistor T1-2. The first metal layer BML1 may be electrically connected to the gate electrodes of the first sub-transistor T1-1 and the second sub-transistor T1-2.

The gate electrodes of the first sub-transistor T1-1 and the second sub-transistor T1-2 may be integrally formed and may be electrically connected to the first clock line CKL1. The first electrode of the first sub-transistor T1-1 may be electrically connected to the start line STL through a fifth connection electrode CNE5 of a first source metal layer SDL1. The second electrode of the first sub-transistor T1-1 and the first electrode of the second sub-transistor T1-2 may be integrally formed. The second electrode of the second sub-transistor T1-2 may be electrically connected to a first node electrode NDE1 of a second gate layer GTL2 through a first connection electrode CNE1 of the first source metal layer SDL1.

The second transistor T2 may include a semiconductor area, a gate electrode, a first electrode, and a second electrode. The semiconductor area, the first electrode, and the second electrode of the second transistor T2 may be disposed in the active layer ACTL, and the gate electrode thereof may be disposed in the first gate layer GTL1. The gate electrode of the second transistor T2 may overlap the semiconductor area.

The first electrode of the second transistor T2 may be electrically connected to the first clock line CKL1 through a thirteenth connection electrode CNE13 of the first source metal layer SDL1. The second electrode of the second transistor T2 may be electrically connected to a second node electrode NDE2 of the second gate layer GTL2 through a fourteenth connection electrode CNE14 of the first source metal layer SDL1. Here, the second node electrode NDE2 may correspond to the second node N2 in FIG. 5. The second node electrode NDE2 may be electrically connected to a gate electrode of the fourth transistor T4 of the first stage STG1 through a sixth connection electrode CNE6 of the first source metal layer SDL1. The second node electrode NDE2 may be electrically connected to a gate electrode of the fourth transistor T4 of the second stage STG2 through a tenth connection electrode CNE10 of the first source metal layer SDL1. The second node electrode NDE2 may be electrically connected to a gate electrode of the fourth transistor T4 of the third stage STG3 through the fourteenth connection electrode CNE14.

The third transistor T3 may include a semiconductor area, a gate electrode, a first electrode, and a second electrode. The semiconductor area, the first electrode, and the second electrode of the third transistor T3 may be disposed in the active layer ACTL, and the gate electrode thereof may be disposed in the first gate layer GTL1. The gate electrode of the third transistor T3 may overlap the semiconductor area.

The gate electrode of the third transistor T3 may be electrically connected to the first clock line CKL1 through a ninth connection electrode CNE9 of the first source metal layer SDL1. The first electrode of the third transistor T3 may be electrically connected to the gate low voltage line VGLL through the fourth connection electrode CNE4 of the first source metal layer SDL1. The second electrode of the third transistor T3 may be electrically connected to the second node electrode NDE2 of the second gate layer GTL2 through a tenth connection electrode CNE10.

The buffer unit BUF of the first stage STG1 may include fourth to sixth transistors T4, T5, and T6 and first and second capacitors C1 and C2.

The fourth transistor T4 of the first stage STG1 may include a semiconductor area, a gate electrode, a first electrode, and a second electrode. The semiconductor area, the first electrode, and the second electrode of the fourth transistor T4 may be disposed in the active layer ACTL, and the gate electrode thereof may be disposed in the first gate layer GTL1. The gate electrode of the fourth transistor T4 may overlap the semiconductor area. A third metal layer BML3 may be disposed in the metal layer BML and overlap the semiconductor area of the fourth transistor T4. The third metal layer BML3 may be electrically connected to the gate electrode of the fourth transistor T4 through the sixth connection electrode CNE6.

The gate electrode of the fourth transistor T4 may be electrically connected to the second node electrode NDE2 through the sixth connection electrode CNE6. The first electrode of the fourth transistor T4 may be electrically connected to the gate high voltage line VGHL through a sixteenth connection electrode CNE16 of the first source metal layer SDL1. The second electrode of the fourth transistor T4 may be formed integrally with a second electrode of the fifth transistor T5. The second electrode of the fourth transistor T4 may be electrically connected to a first gate connection electrode GNE1 of a third gate layer GTL3 through a seventeenth connection electrode CNE17 of the first source metal layer SDL1. Here, the first gate connection electrode GNE1 may correspond to the output node of the first stage STG1 in FIG. 5, and may supply the first scan write signal GW1 to the first scan write line GWL1.

The fifth transistor T5 of the first stage STG1 may include a semiconductor area, a gate electrode, a first electrode, and a second electrode. The semiconductor area, the first electrode, and the second electrode of the fifth transistor T5 may be disposed in the active layer ACTL, and the gate electrode thereof may be disposed in the first gate layer GTL1. The gate electrode of the fifth transistor T5 may overlap the semiconductor area. A fourth metal layer BML4 may be disposed in the metal layer BML and overlap the semiconductor area of the fifth transistor T5. The fourth metal layer BML4 may be electrically connected to the gate electrode of the fifth transistor T5 through a seventh connection electrode CNE7.

The gate electrode of the fifth transistor T5 may be electrically connected to a second electrode of the sixth transistor T6 through the seventh connection electrode CNE7. The first electrode of the fifth transistor T5 may be electrically connected to the second clock line CKL2 through an eighth connection electrode CNE8 of the first source metal layer SDL1. The second electrode of the fifth transistor T5 may be formed integrally with the second electrode of the fourth transistor T4. The second electrode of the fifth transistor T5 may be electrically connected to the first gate connection electrode GNE1 through the seventeenth connection electrode CNE17.

The sixth transistor T6 of the first stage STG1 may include a semiconductor area, a gate electrode, a first electrode, and a second electrode. The semiconductor area, the first electrode, and the second electrode of the sixth transistor T6 may be disposed in the active layer ACTL, and the gate electrode thereof may be disposed in the first gate layer GTL1. The gate electrode of the sixth transistor T6 may overlap the semiconductor area. A second metal layer BML2 may be disposed in the metal layer BML and overlap the semiconductor area of the sixth transistor T6. The second metal layer BML2 may be electrically connected to the gate electrode of the sixth transistor T6 through the fourth connection electrode CNE4 of the first source metal layer SDL1.

The gate electrode of the sixth transistor T6 may be electrically connected to the gate low voltage line VGLL through the fourth connection electrode CNE4. The first electrode of the sixth transistor T6 may be electrically connected to the first node electrode NDE1 through the first connection electrode CNE1. The second electrode of the sixth transistor T6 may be electrically connected to the gate electrode of the fifth transistor T5 through the seventh connection electrode CNE7.

The first capacitor C1 of the first stage STG1 may be connected between the second node N2 and the input terminal of the gate high voltage VGH. A first electrode of the first capacitor C1 may include the gate electrode of the fourth transistor T4, and a second electrode of the first capacitor C1 may be disposed in the second gate layer GTL2. The second electrode of the first capacitor C1 may be electrically connected to the gate high voltage line VGHL through the sixteenth connection electrode CNE16.

The second capacitor C2 of the first stage STG1 may be connected between the output terminal and the gate electrode of the fifth transistor T5. A first electrode of the second capacitor C2 may include the gate electrode of the fifth transistor T5, and a second electrode of the second capacitor C2 may be disposed in the second gate layer GTL2. The second electrode of the second capacitor C2 may be electrically connected to the first gate connection electrode GNE1 through the seventeenth connection electrode CNE17.

The buffer unit BUF of the second stage STG2 may include fourth to sixth transistors T4, T5, and T6 and first and second capacitors C1 and C2.

The fourth transistor T4 of the second stage STG2 may include a semiconductor area, a gate electrode, a first electrode, and a second electrode. The semiconductor area, the first electrode, and the second electrode of the fourth transistor T4 may be disposed in the active layer ACTL, and the gate electrode thereof may be disposed in the first gate layer GTL1. The gate electrode of the fourth transistor T4 may overlap the semiconductor area. A third metal layer BML3 may be disposed in the metal layer BML and overlap the semiconductor area of the fourth transistor T4. The third metal layer BML3 may be electrically connected to the gate electrode of the fourth transistor T4 through the tenth connection electrode CNE10.

The gate electrode of the fourth transistor T4 may be electrically connected to the second node electrode NDE2 through the tenth connection electrode CNE10. The first electrode of the fourth transistor T4 may be electrically connected to the gate high voltage line VGHL through the sixteenth connection electrode CNE16. The second electrode of the fourth transistor T4 may be formed integrally with a second electrode of the fifth transistor T5. The second electrode of the fourth transistor T4 may be electrically connected to a second gate connection electrode GNE2 of the third gate layer GTL3 through the eighteenth connection electrode CNE18 of the first source metal layer SDL1. Here, the second gate connection electrode GNE2 may correspond to the output node of the second stage STG2 in FIG. 5, and may supply the second scan write signal GW2 to the second scan write line GWL2.

The fifth transistor T5 of the second stage STG2 may include a semiconductor area, a gate electrode, a first electrode, and a second electrode. The semiconductor area, the first electrode, and the second electrode of the fifth transistor T5 may be disposed in the active layer ACTL, and the gate electrode thereof may be disposed in the first gate layer GTL1. The gate electrode of the fifth transistor T5 may overlap the semiconductor area. A fourth metal layer BML4 may be disposed in the metal layer BML and overlap the semiconductor area of the fifth transistor T5. The fourth metal layer BML4 may be electrically connected to the gate electrode of the fifth transistor T5 through an eleventh connection electrode CNE11.

The gate electrode of the fifth transistor T5 may be electrically connected to a second electrode of the sixth transistor T6 through the eleventh connection electrode CNE11. The first electrode of the fifth transistor T5 may be electrically connected to the third clock line CKL3 through a twelfth connection electrode CNE12 of the first source metal layer SDL1. The second electrode of the fifth transistor T5 may be formed integrally with the second electrode of the fourth transistor T4. The second electrode of the fifth transistor T5 may be electrically connected to the second gate connection electrode GNE2 through the eighteenth connection electrode CNE18.

The sixth transistor T6 of the second stage STG2 may include a semiconductor area, a gate electrode, a first electrode, and a second electrode. The semiconductor area, the first electrode, and the second electrode of the sixth transistor T6 may be disposed in the active layer ACTL, and the gate electrode thereof may be disposed in the first gate layer GTL1. The gate electrode of the sixth transistor T6 may overlap the semiconductor area. A second metal layer BML2 may be disposed in the metal layer BML and overlap the semiconductor area of the sixth transistor T6. The second metal layer BML2 may be electrically connected to the gate electrode of the sixth transistor T6 through the fourth connection electrode CNE4.

The gate electrode of the sixth transistor T6 may be electrically connected to the gate low voltage line VGLL through the fourth connection electrode CNE4. The first electrode of the sixth transistor T6 may be electrically connected to the first node electrode NDE1 through the second connection electrode CNE2. The second electrode of the sixth transistor T6 may be electrically connected to the gate electrode of the fifth transistor T5 through the eleventh connection electrode CNE11.

The first capacitor C1 of the second stage STG2 may be connected between the second node N2 and the input terminal of the gate high voltage VGH. A first electrode of the first capacitor C1 may include the gate electrode of the fourth transistor T4, and a second electrode of the first capacitor C1 may be disposed in the second gate layer GTL2. The second electrode of the first capacitor C1 may be electrically connected to the gate high voltage line VGHL through the sixteenth connection electrode CNE16.

The second capacitor C2 of the second stage STG2 may be connected between the output terminal and the gate electrode of the fifth transistor T5. A first electrode of the second capacitor C2 may include the gate electrode of the fifth transistor T5, and a second electrode of the second capacitor C2 may be disposed in the second gate layer GTL2. The second electrode of the second capacitor C2 may be electrically connected to the second gate connection electrode GNE2 through the eighteenth connection electrode CNE18.

The buffer unit BUF of the third stage STG3 may include fourth to sixth transistors T4, T5, and T6 and first and second capacitors C1 and C2.

The fourth transistor T4 of the third stage STG3 may include a semiconductor area, a gate electrode, a first electrode, and a second electrode. The semiconductor area, the first electrode, and the second electrode of the fourth transistor T4 may be disposed in the active layer ACTL, and the gate electrode thereof may be disposed in the first gate layer GTL1. The gate electrode of the fourth transistor T4 may overlap the semiconductor area. A third metal layer BML3 may be disposed in the metal layer BML and overlap the semiconductor area of the fourth transistor T4. The third metal layer BML3 may be electrically connected to the gate electrode of the fourth transistor T4 through the fourteenth connection electrode CNE14.

The gate electrode of the fourth transistor T4 may be electrically connected to the second node electrode NDE2 through the fourteenth connection electrode CNE14. The first electrode of the fourth transistor T4 may be electrically connected to the gate high voltage line VGHL through the sixteenth connection electrode CNE16. The second electrode of the fourth transistor T4 may be formed integrally with a second electrode of the fifth transistor T5. The second electrode of the fourth transistor T4 may be electrically connected to a third gate connection electrode GNE3 of the third gate layer GTL3 through a nineteenth connection electrode CNE19 of the first source metal layer SDL1. Here, the third gate connection electrode GNE3 may correspond to the output node of the third stage STG3 in FIG. 5, and may supply the third scan write signal GW3 to the third scan write line GWL3.

The fifth transistor T5 of the third stage STG3 may include a semiconductor area, a gate electrode, a first electrode, and a second electrode. The semiconductor area, the first electrode, and the second electrode of the fifth transistor T5 may be disposed in the active layer ACTL, and the gate electrode thereof may be disposed in the first gate layer GTL1. The gate electrode of the fifth transistor T5 may overlap the semiconductor area. A fourth metal layer BML4 may be disposed in the metal layer BML and overlap the semiconductor area of the fifth transistor T5. The fourth metal layer BML4 may be electrically connected to the gate electrode of the fifth transistor T5 through a twentieth connection electrode CNE20 of the first source metal layer SDL1.

The gate electrode of the fifth transistor T5 may be electrically connected to a second electrode of the sixth transistor T6 through the twentieth connection electrode CNE20. The first electrode of the fifth transistor T5 may be electrically connected to the fourth clock line CKL4 through a fifteenth connection electrode CNE15 of the first source metal layer SDL1. The second electrode of the fifth transistor T5 may be formed integrally with the second electrode of the fourth transistor T4. The second electrode of the fifth transistor T5 may be electrically connected to the third gate connection electrode GNE3 through the nineteenth connection electrode CNE19.

The sixth transistor T6 of the third stage STG3 may include a semiconductor area, a gate electrode, a first electrode, and a second electrode. The semiconductor area, the first electrode, and the second electrode of the sixth transistor T6 may be disposed in the active layer ACTL, and the gate electrode thereof may be disposed in the first gate layer GTL1. The gate electrode of the sixth transistor T6 may overlap the semiconductor area. A second metal layer BML2 may be disposed in the metal layer BML and overlap the semiconductor area of the sixth transistor T6. The second metal layer BML2 may be electrically connected to the gate electrode of the sixth transistor T6 through the fourth connection electrode CNE4.

The gate electrode of the sixth transistor T6 may be electrically connected to the gate low voltage line VGLL through the fourth connection electrode CNE4. The first electrode of the sixth transistor T6 may be electrically connected to the first node electrode NDE1 through the third connection electrode CNE3. The second electrode of the sixth transistor T6 may be electrically connected to the gate electrode of the fifth transistor T5 through the twentieth connection electrode CNE20.

The first capacitor C1 of the third stage STG3 may be connected between the second node N2 and the input terminal of the gate high voltage VGH. A first electrode of the first capacitor C1 may include the gate electrode of the fourth transistor T4, and a second electrode of the first capacitor C1 may be disposed in the second gate layer GTL2. The second electrode of the first capacitor C1 may be electrically connected to the gate high voltage line VGHL through the sixteenth connection electrode CNE16.

The second capacitor C2 of the third stage STG3 may be connected between the output terminal and the gate electrode of the fifth transistor T5. A first electrode of the second capacitor C2 may include the gate electrode of the fifth transistor T5, and a second electrode of the second capacitor C2 may be disposed in the second gate layer GTL2. The second electrode of the second capacitor C2 may be electrically connected to the third gate connection electrode GNE3 through the nineteenth connection electrode CNE19.

The first to sixth transistors T1, T2, T3, T4, T5, and T6 of the first unit stage USG1 may include a silicon-based semiconductor area. For example, the first to sixth transistors T1, T2, T3, T4, T5, and T6 may include a semiconductor area made of low temperature polycrystalline silicon (LTPS). The semiconductor area made of low temperature polycrystalline silicon may have high electron mobility and excellent turn-on characteristics. Therefore, in an embodiment, the display device 10 includes the first to sixth transistors T1, T2, T3, T4, T5, and T6 with excellent turn-on characteristics, thereby stably and efficiently driving the scan driver 800.

In an embodiment, the first to sixth transistors T1, T2, T3, T4, T5, and T6 may be p-type transistors. For example, the p-type transistor may output a current flowing into the first electrode to the second electrode based on the gate low voltage applied to the gate electrode.

In an embodiment, at least one of the first to sixth transistors T1, T2, T3, T4, T5, and T6 may include an oxide-based semiconductor area. For example, the first to sixth transistors T1, T2, T3, T4, T5, and T6 may have a coplanar structure in which the gate electrode is disposed above the oxide-based semiconductor area. A transistor with a coplanar structure may have excellent leakage current characteristics and may be driven at low frequencies, thereby reducing power consumption. Therefore, in an embodiment, the display device 10 includes the transistor with excellent leakage current characteristics, which may prevent leakage current from flowing inside the scan driver 800 and stably keep the voltage inside the scan driver 800.

At least one of the first to sixth transistors T1, T2, T3, T4, T5, and T6 may be an n-type transistor. For example, the n-type transistor may output a current flowing into the first electrode to the second electrode based on the gate high voltage applied to the gate electrode.

In FIG. 10, the display panel 100 may include a substrate SUB, a metal layer BML, a buffer layer BF, an active layer ACTL, a first gate insulating layer GI1, a first gate layer GTL1, a second gate insulating layer GI2, a second gate layer GTL2, a first interlayer insulating layer ILD1, a third gate layer GTL3, a second interlayer insulating layer ILD2, a first source metal layer SDL1, a first via layer VIA1, and a second source metal layer SDL2.

The substrate SUB may be a base substrate or a base member. The substrate SUB may be a flexible substrate that may be bent, folded, rolled, or the like. For example, in an embodiment, the substrate SUB may include a polymer resin such as polyimide PI, but is not limited thereto. In an embodiment, the substrate SUB may include a glass material or a metal material.

The metal layer BML may be disposed on the substrate SUB. The metal layer BML may include third and fourth metal layers BML3 and BML4. The third metal layer BML3 may overlap a semiconductor area ACT4 of the fourth transistor T4, and the fourth metal layer BML4 may overlap a semiconductor area ACT5 of the fifth transistor T5.

The buffer layer BF may be disposed on the metal layer BML. For example, the buffer layer BF may include an inorganic film capable of preventing permeation of air or moisture. For example, the buffer layer BF may include a plurality of inorganic films that are alternately stacked.

The active layer ACTL may be disposed on the buffer layer BF. The active layer ACTL may include a silicon-based material. For example, the active layer ACTL may be made of low temperature polycrystalline silicon (LTPS). The active layer ACTL may include a semiconductor area ACT4, a first electrode SE4, and a second electrode DE4 of the fourth transistor T4, as well as a semiconductor area ACT5, a first electrode SE5, and a second electrode DE5 of the fifth transistor T5.

The first gate insulating layer GI1 may be disposed on the active layer ACTL. The first gate insulating layer GI1 may insulate the active layer ACTL and the first gate layer GTL1 from each other.

The first gate layer GTL1 may be disposed on the first gate insulating layer GI1. The first gate layer GTL1 may include a first electrode C1*a* of the first capacitor C1 and a first electrode C2*a* of the second capacitor C2. The first electrode C1*a* of the first capacitor C1 may include a gate electrode GE4 of the fourth transistor T4, and the first electrode C2*a* of the second capacitor C2 may include a gate electrode GE5 of the fifth transistor T5.

The second gate insulating layer GI2 may be disposed on the first gate layer GTL1. The second gate insulating layer GI2 may insulate the first gate layer GTL1 and the second gate layer GTL2 from each other.

The second gate layer GTL2 may be disposed on the second gate insulating layer GI2. The second gate layer GTL2 may include a second electrode C1*b* of the first capacitor C1 and a second electrode C2*b* of the second capacitor C2. The second electrode C1*b* of the first capacitor C1 may overlap the first electrode C1*a*, and the second electrode C2*b* of the second capacitor C2 may overlap the first electrode C2*a*.

The first interlayer insulating layer ILD1 may be disposed on the second gate layer GTL2. The first interlayer insulating layer ILD1 may insulate the second gate layer GTL2 and the third gate layer GTL3 from each other.

The third gate layer GTL3 may be disposed on the first interlayer insulating layer ILD1. The third gate layer GTL3 may include a first gate connection electrode GNE1. The first gate connection electrode GNE1 may correspond to the output node of the first stage STG1 in FIG. 5, and may supply the first scan write signal GW1 to the first scan write line GWL1.

The second interlayer insulating layer ILD2 may be disposed on the third gate layer GTL3. The second interlayer insulating layer ILD2 may insulate the third gate layer GTL3 and the first source metal layer SDL1 from each other.

The first source metal layer SDL1 may be disposed on the second interlayer insulating layer ILD2. The first source metal layer SDL1 may include an eighth connection electrode CNE8, a sixteenth connection electrode CNE16, and a seventeenth connection electrode CNE17. The eighth connection electrode CNE8 may electrically connect the second clock line CKL2 and the first electrode SE5 of the fifth transistor T5. The sixteenth connection electrode CNE16 may electrically connect the gate high voltage line VGHL and the first electrode SE4 of the fourth transistor T4. The seventeenth connection electrode CNE17 may electrically connect the second electrode DE4 of the fourth transistor T4, the second electrode DE5 of the fifth transistor T5, the second electrode C2*b* of the second capacitor C2, and the first gate connection electrode GNE1.

The first via layer VIA1 may be disposed on the first source metal layer SDL1. The first via layer VIA1 may insulate the first source metal layer SDL1 and the second source metal layer SDL2 from each other.

The second source metal layer SDL2 may be disposed on the first via layer VIA1. The second source metal layer SDL2 may include a gate high voltage line VGHL and a second clock line CKL2.

In FIG. 11, the first connection electrode CNE1 may electrically connect a first electrode SE6 of the sixth transistor T6 of the first stage STG1 and the first node electrode NDE1.

The second connection electrode CNE2 may electrically connect the first node electrodes NDE1 and a first electrode SE6 of the sixth transistor T6 of the second stage STG2 that are spaced apart from each other in the Y-axis direction.

The third connection electrode CNE3 may electrically connect a first electrode SE6 of the sixth transistor T6 of the third stage STG3 and the first node electrode NDE1.

Referring to FIGS. 3, 8, 9, and 11, the second gate line GCL may include first to third portions GCL1, GCL2, and GCL3. The first portion GCL1 of the second gate line GCL may be disposed in the third gate layer GTL3 and extend in the X-axis direction. The first portion GCL1 of the second gate line GCL may intersect the first node electrode NDE1 overlapping the first and second stages STG1 and STG2.

The second portion GCL2 of the second gate line GCL may be disposed in the third gate layer GTL3 and spaced apart from the first portion GCL1. The second portion GCL2 of the second gate line GCL may be branched into a plurality of branches.

The third portion GCL3 of the second gate line GCL may be disposed in the first source metal layer SDL1 and electrically connect the first and second portions GCL1 and GCL2.

The light-emitting control line EML may include first to third portions EML1, EML2, and EML3. The first portion EML1 of the light-emitting control line EML may be disposed in the third gate layer GTL3 and extend in the X-axis direction. The first portion EML1 of the light-emitting control line EML may intersect the first node electrode NDE1 overlapping the first and second stages STG2 and STG3.

The second portion EML2 of the light-emitting control line EML may be disposed in the first gate layer GTL1, extend in the X-axis direction, and be spaced apart from the first portion EML1.

The third portion EML3 of the light-emitting control line EML may be disposed in the first source metal layer SDL1 and electrically connect the first and second portions EML1 and EML2.

Figure 12:
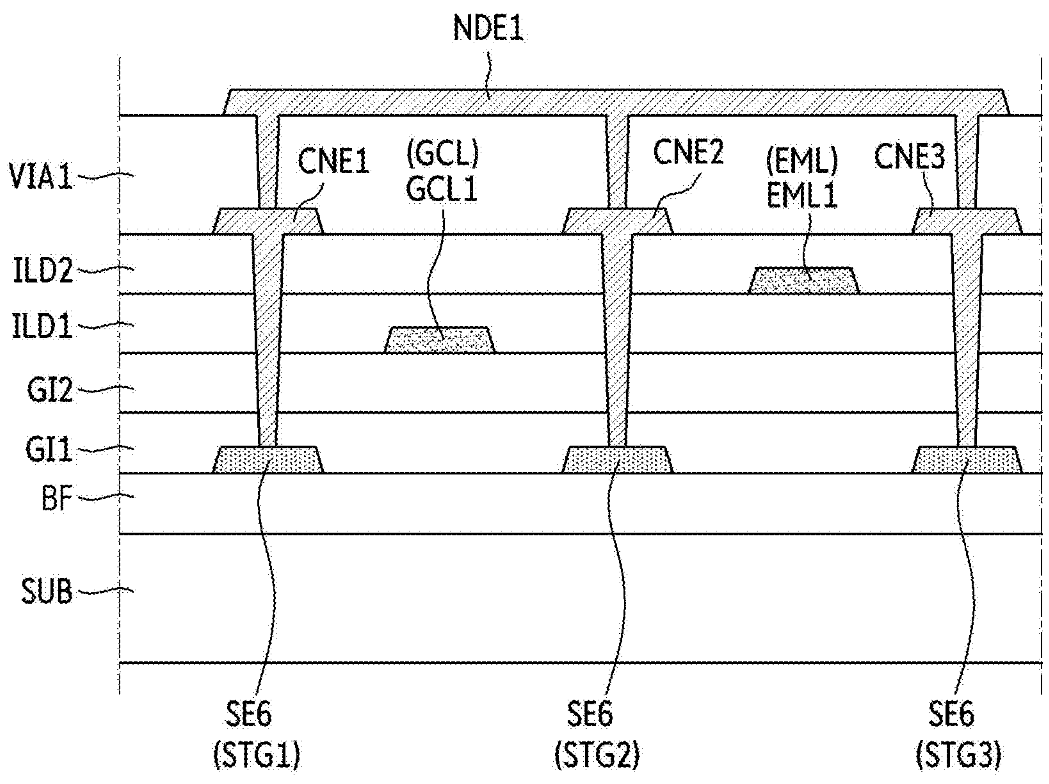
FIG. 12 is a cross-sectional view illustrating a portion of a first unit stage in a display device according to an embodiment.

FIG. 12 is a cross-sectional view illustrating a portion of a first unit stage in a display device according to an embodiment. A display device of FIG. 12 has a different configuration of the first node electrode NDE1 and the first portion GCL1 of the second gate line GCL from the display device of FIG. 11. For convenience of explanation, a further description of the components and technical aspects previously described with reference to FIG. 11 will be briefly described or omitted.

Referring to FIG. 12, the first portion GCL1 of the second gate line GCL may be disposed in the second gate layer GTL2 and extend in the X-axis direction. The first portion GCL1 of the second gate line GCL may intersect the first node electrode NDE1.

The first portion EML1 of the light-emitting control line EML may be disposed in the third gate layer GTL3 and extend in the X-axis direction. The first portion EML1 of the light-emitting control line EML may intersect the first node electrode NDE1.

The first node electrode NDE1 may be disposed in the second source metal layer SDL2. Referring to FIG. 8, the first node electrode NDE1 may extend in the Y-axis direction. The first node electrode NDE1 may be electrically connected to the first electrode SE6 of the sixth transistor T6 of the first stage STG1 through the first connection electrode CNE1 of the first source metal layer SDL1. The first node electrode NDE1 may be electrically connected to the first electrode SE6 of the sixth transistor T6 of the second stage STG2 through the second connection electrode CNE2 of the first source metal layer SDL1. The first node electrode NDE1 may be electrically connected to the first electrode SE6 of the sixth transistor T6 of the third stage STG3 through the third connection electrode CNE3 of the first source metal layer SDL1.

The first node electrode NDE1 may be disposed in the second source metal layer SDL2. As a result, coupling with the second gate line GCL and the light-emitting control line EML may be reduced.

Figure 13:
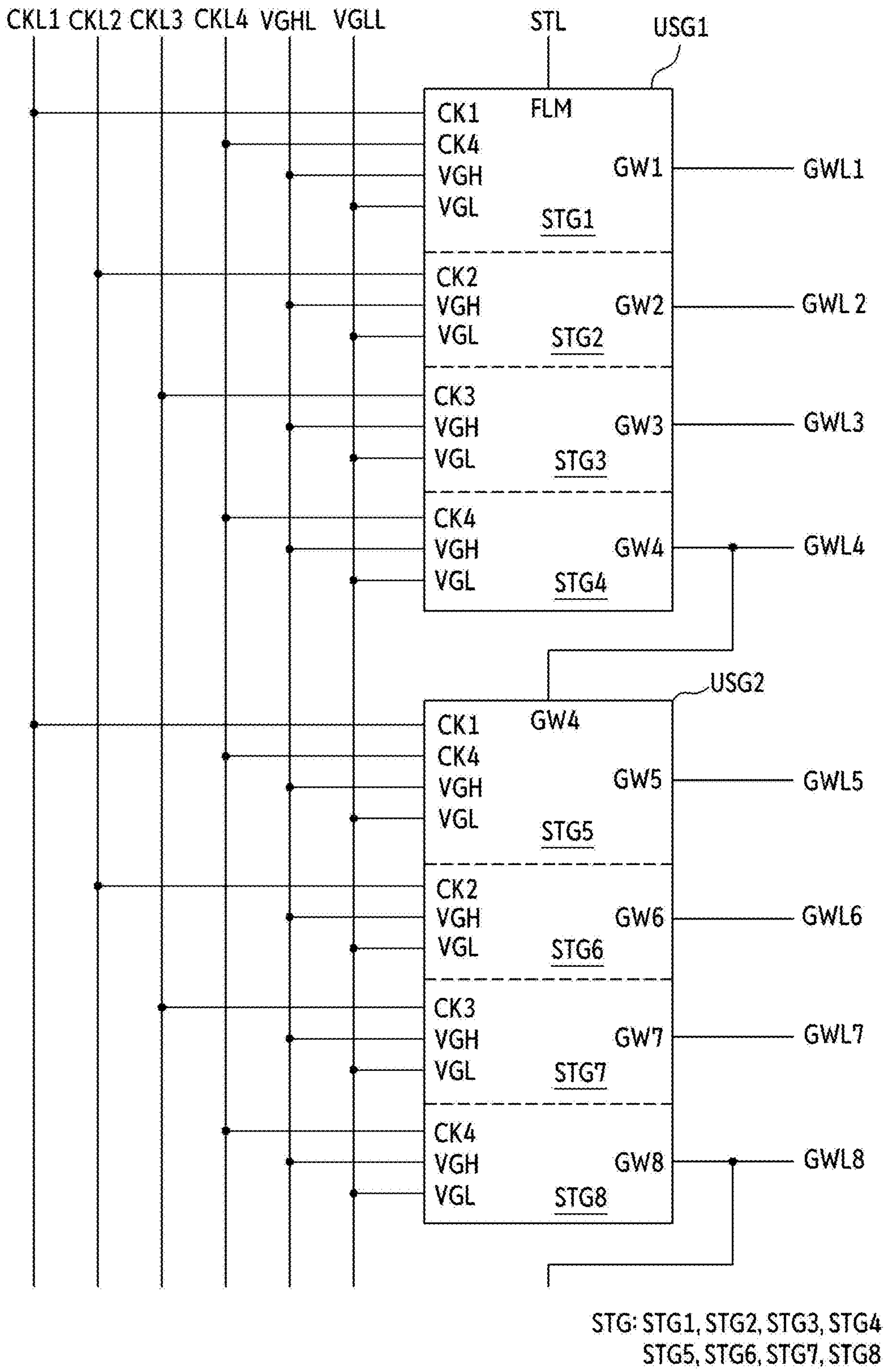
FIG. 13 is a block diagram illustrating a scan driver of a display device according to an embodiment.

FIG. 13 is a block diagram illustrating a scan driver of a display device according to an embodiment.

Referring to FIG. 13, first to fourth clock lines CKL1, CKL2, CKL3, and CKL4 may supply first to fourth clock signals CK1, CK2, CK3, and CK4 to a plurality of stages STG. A gate high voltage line VGHL may supply a gate high voltage VGH to the stages STG, and a gate low voltage line VGLL may supply a gate low voltage VGL to the stages STG.

The gate driver 810 may include a plurality of unit stages USG. As the stages STG within the unit stage USG share some transistors, the number of transistors of the gate driver 810 is reduced. As a result, an area of the non-display area NDA and power consumption may be reduced. In an embodiment, the stages STG may generate a scan write signal and supply it to the first gate line GWL or the scan write line of FIG. 3. In an embodiment, the stages STG may supply scan signals to the second to fourth gate lines GCL, GIL, and GBL of FIG. 3.

For example, in an embodiment, the gate driver 810 may be structured to include multiple unit stages USG. Within each unit stage USG, several stages STG may be configured to share specific transistors in an arrangement that effectively reduces the overall number of transistors required by the gate driver 810. This reduction in transistor count not only may conserve valuable space within the non-display area NDA, but also may reduce power consumption, contributing to a more efficient design.

Each stage STG within the unit stages USG is capable of generating a scan write signal, which may be routed to the first gate line GWL or to a scan write line, as illustrated in FIG. 3. Furthermore, the stages STG may also be configured to deliver scan signals to additional gate lines, including the second, third, and fourth gate lines GCL, GIL, and GBL shown in FIG. 3. This signal output capability supports the coordinated operation of various gate lines within the display device, which may improve its performance and reliability.

The unit stage USG may include first and second unit stages USG1 and USG2.

The first unit stage USG1 may include first to fourth stages STG1, STG2, STG3, and STG4, but the number of stages STG in the unit stage USG is not limited thereto.

The first stage STG1 may be connected to a start line STL and may receive a start signal FLM. The first stage STG1 may receive the first and fourth clock signals CK1 and CK4, the gate high voltage VGH, and the gate low voltage VGL, and supply a first scan write signal GW1 to the first scan write line GWL1.

The second stage STG2 may receive the second clock signal CK2, the gate high voltage VGH, and the gate low voltage VGL, and supply a second scan write signal GW2 to a second scan write line GWL2.

The third stage STG3 may receive the third clock signal CK3, the gate high voltage VGH, and the gate low voltage VGL, and supply a third scan write signal GW3 to a third scan write line GWL3.

The fourth stage STG4 may receive the fourth clock signal CK4, the gate high voltage VGH, and the gate low voltage VGL, and supply a fourth scan write signal GW4 to a fourth scan write line GWL4.

The second unit stage USG2 may include fifth to eighth stages STG5, STG6, STG7, and STG8.

The fifth stage STG5 may receive the fourth scan write signal GW4 of the fourth stage STG4 as a carry signal. The fifth stage STG5 may receive the first and fourth clock signals CK1 and CK4, the gate high voltage VGH, and the gate low voltage VGL, and supply a fifth scan write signal GW5 to a fifth scan write line GWL5.

The sixth stage STG6 may receive the second clock signal CK2, the gate high voltage VGH, and the gate low voltage VGL, and supply a sixth scan write signal GW6 to a sixth scan write line GWL6.

The seventh stage STG7 may receive the third clock signal CK3, the gate high voltage VGH, and the gate low voltage VGL, and supply a seventh scan write signal GW7 to a seventh scan write line GWL7.

The eighth stage STG8 may receive the third clock signal CK3, the gate high voltage VGH, and the gate low voltage VGL, and supply an eighth scan write signal GW8 to an eighth scan write line GWL8.

Herein, the first to eighth scan write signals GW1 to GW8 may also be referred to as first to eighth scan signals, respectively.

Figure 14:
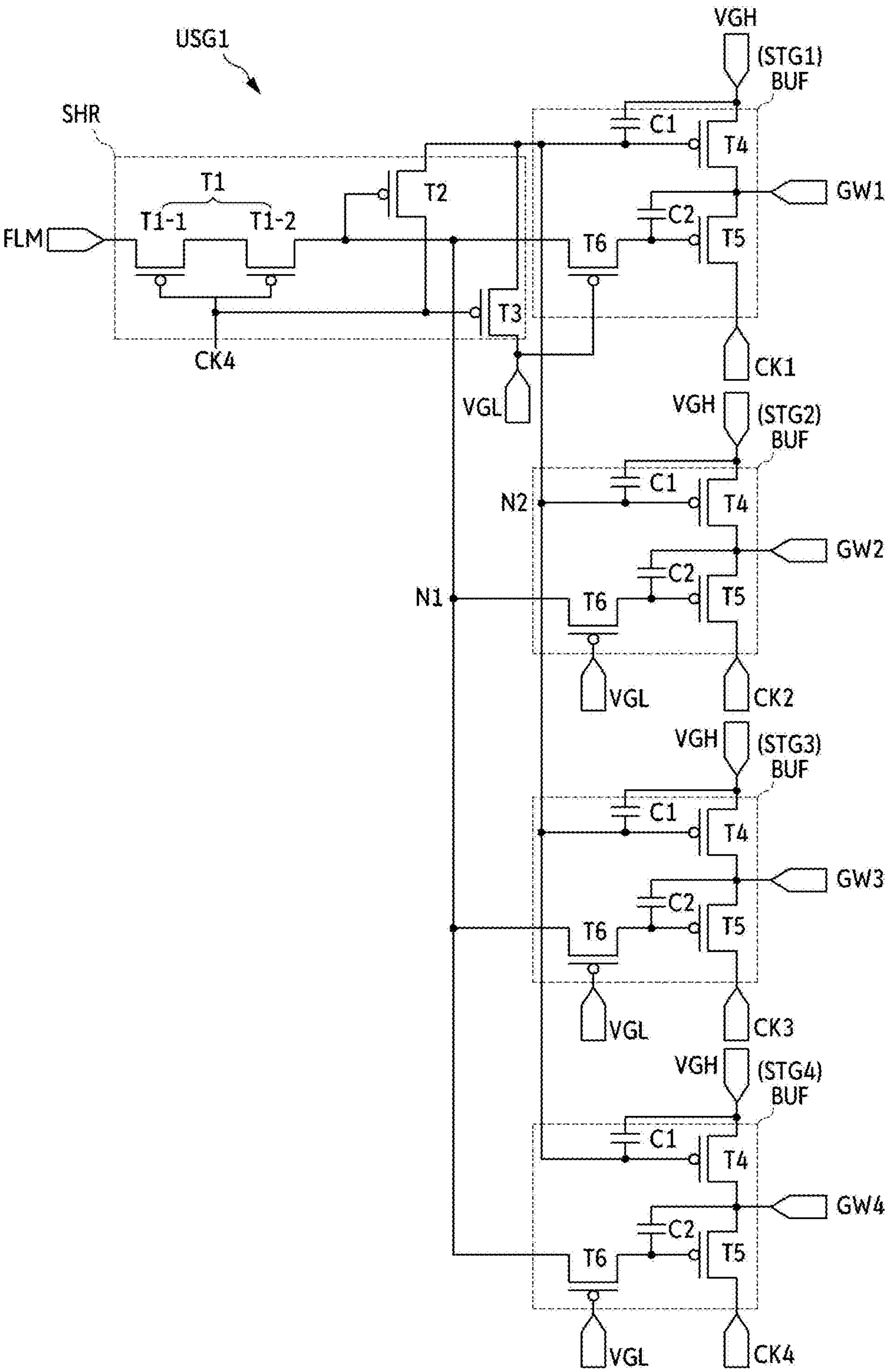
FIG. 14 is a circuit diagram illustrating a first unit stage of the scan driver in a display device according to an embodiment.

FIG. 14 is a circuit diagram illustrating a first unit stage of the scan driver in the display device according to an embodiment.

Referring to FIG. 14, the first unit stage USG1 may include first to fourth stages STG1, STG2, STG3, and STG4.

The first to fourth stages STG1, STG2, STG3, and STG4 may share a sharing unit SHR and may each include a buffer unit BUF. Therefore, one unit stage USG may include one sharing unit SHR and a plurality of buffer units BUF.

The sharing unit SHR may include first to third transistors T1, T2, and T3.

The first transistor T1 may supply the start signal FLM to a first node N1 based on the fourth clock signal CK4. The buffer unit BUF of each of the first to fourth stages STG1, STG2, STG3, and STG4 may be directly connected to the first node N1. The first transistor T1 may include a first sub-transistor T1-1 and a second sub-transistor T1-2 connected in series between an input terminal of the start signal FLM and the first node N1.

The second transistor T2 may supply the fourth clock signal CK4 to a second node N2 based on a voltage of the first node N1. The buffer unit BUF of each of the first to fourth stages STG1, STG2, STG3, and STG4 may be directly connected to the second node N2.

The third transistor T3 may supply the gate low voltage VGL to the second node N2 based on the fourth clock signal CK4.

The buffer unit BUF of each of the first to fourth stages STG1, STG2, STG3, and STG4 may include fourth to sixth transistors T4, T5, and T6 and first and second capacitors C1 and C2. The buffer unit BUF of each of the first to fourth stages STG1, STG2, STG3, and STG4 may output the first to fourth scan write signals GW1, GW2, GW3, and GW4 through an output node.

The fourth transistor T4 may supply the gate high voltage VGH to the output node based on a voltage of the second node N2.

The fifth transistor T5 of the first stage STG1 may supply the first clock signal CK1 to the output node based on a voltage of a second electrode of the sixth transistor T6. The fifth transistor T5 of the second stage STG2 may supply the second clock signal CK2 to the output node based on the voltage of the second electrode of the sixth transistor T6. The fifth transistor T5 of the third stage STG3 may supply the third clock signal CK3 to the output node based on the voltage of the second electrode of the sixth transistor T6. The fifth transistor T5 of the fourth stage STG4 may supply the fourth clock signal CK4 to the output node based on the voltage of the second electrode of the sixth transistor T6.

The sixth transistor T6 may supply the voltage of the first node N1 to the gate electrode of the fifth transistor T5 based on the gate low voltage VGL.

The first capacitor C1 may be connected between the second node N2 and an input terminal of the gate high voltage VGH to maintain A potential difference may be maintained between the second node N2 and an input terminal of the gate high voltage VGH by connecting the first capacitor C1 between the second node N2 and the input terminal of the gate high voltage VGH.

A potential difference may be maintained between an output terminal and the gate electrode of the fifth transistor T5 by connecting the second capacitor C2 between the output terminal and the gate electrode of the fifth transistor T5.

Therefore, in an embodiment, as one unit stage USG includes one sharing unit SHR and the plurality of buffer units BUF, the number of transistors of the gate driver 810 is reduced. As a result, an area of the non-display area NDA and power consumption may be reduced.

Figure 15:
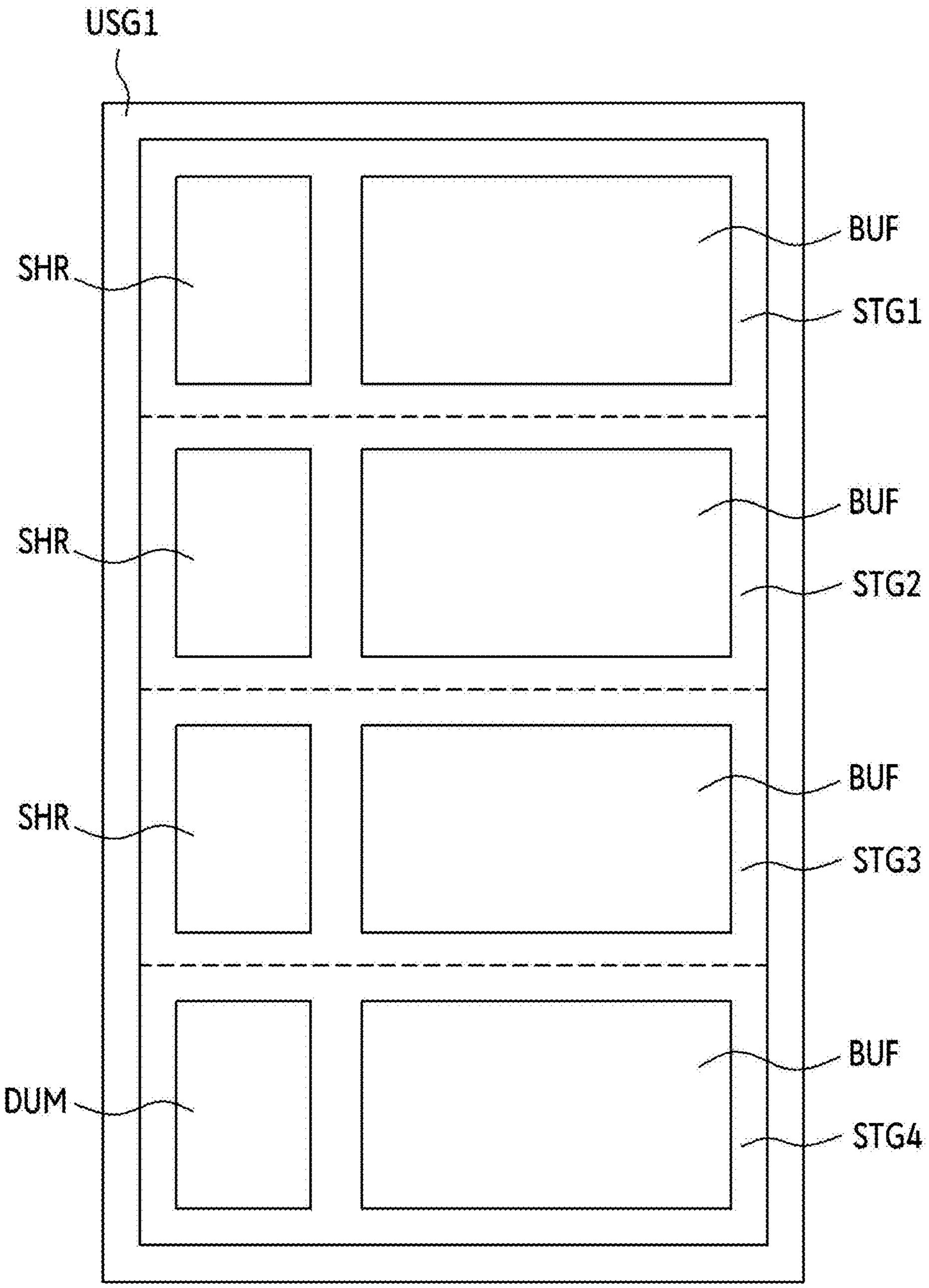
FIG. 15 is a diagram briefly illustrating a first unit stage of a scan driver in a display device according to an embodiment.

FIG. 15 is a diagram briefly illustrating the first unit stage of the scan driver in the display device according to an embodiment.

Referring to FIG. 15, the first unit stage USG1 may include first to fourth stages STG1, STG2, STG3, and STG4.

The first to fourth stages STG1, STG2, STG3, and STG4 may share a sharing unit SHR and may each include a buffer unit BUF. Therefore, one unit stage USG may include one sharing unit SHR, a dummy unit DUM, and a plurality of buffer units BUF. The sharing unit SHR may include first to third transistors T1, T2, and T3. In FIG. 15, the sharing unit SHR being divided and disposed in the first to third stages STG1, STG2, and STG3 means that each of the first to third stages STG1, STG2, and STG3 includes the first to third transistors T1, T2, and T3, respectively, and the fourth stage STG4 may include the dummy unit DUM in a space where the sharing unit SHR is disposed. The first stage STG1 may include one of the first to third transistors T1, T2, and T3 and a buffer unit BUF, the second stage STG2 may include another of the first to third transistors T1, T2, and T3 and a buffer unit BUF, and the third stage STG3 may include the other of the first to third transistors T1, T2, and T3 and a buffer unit BUF. The fourth stage STG4 may include the dummy unit DUM and a buffer unit BUF. The dummy unit DUM may be disposed considering pattern density of an area where the sharing unit SHR is not disposed. The dummy unit DUM may be disposed on the same layer as the first to third transistors T1, T2, and T3.

Therefore, three of the first to fourth stages STG1, STG2, STG3, and STG4 may include the first to third transistors T1, T2, and T3, respectively, and the remaining one stage may include the dummy unit DUM. As one unit stage USG includes one sharing unit SHR and the plurality of buffer units BUF, the number of transistors of the gate driver 810 is reduced. As a result, an area of the non-display area NDA and power consumption may be reduced.

For example, in an embodiment, the first to fourth stages STG1, STG2, STG3, and STG4 may be designed to share a single sharing unit SHR, with each stage incorporating its own buffer unit BUF. This configuration may allow each unit stage USG to include one sharing unit SHR, a dummy unit DUM, and multiple buffer units BUF, which results in a more efficient layout and reduces the need for additional components. The sharing unit SHR itself may include three transistors, T1, T2, and T3, which are distributed across the first three stages STG1, STG2, and STG3. For example, each of the first three stages may include one of these transistors, along with a buffer unit BUF. The fourth stage STG4, in contrast, may include the dummy unit DUM in the location where a part of the sharing unit SHR would otherwise be located, resulting in a balanced layout distribution.

In this arrangement, the first stage STG1 may include one of the transistors T1, T2, or T3 and a buffer unit BUF. Similarly, the second and third stages STG2 and STG3 may each house another of the transistors and their respective buffer units. The fourth stage STG4, however, may include the dummy unit DUM and a buffer unit BUF instead of one of the transistors from the sharing unit SHR. Placement of the dummy unit DUM may help maintain pattern density consistency in the region where components from the sharing unit SHR are not present, and the dummy unit DUM may be disposed on the same layer as the transistors T1, T2, and T3, contributing to a uniform circuit layout.

As a result, three of the four stages STG1, STG2, and STG3 may each include one of the transistors T1, T2, or T3, while the remaining stage STG4 may include the dummy unit DUM. This configuration, in which one unit stage USG incorporates a single sharing unit SHR and multiple buffer units BUF, may effectively reduce the overall transistor count required in the gate driver 810. As a result, embodiments may conserve space in the non-display area (NDA) and lower power consumption.

Figure 16:
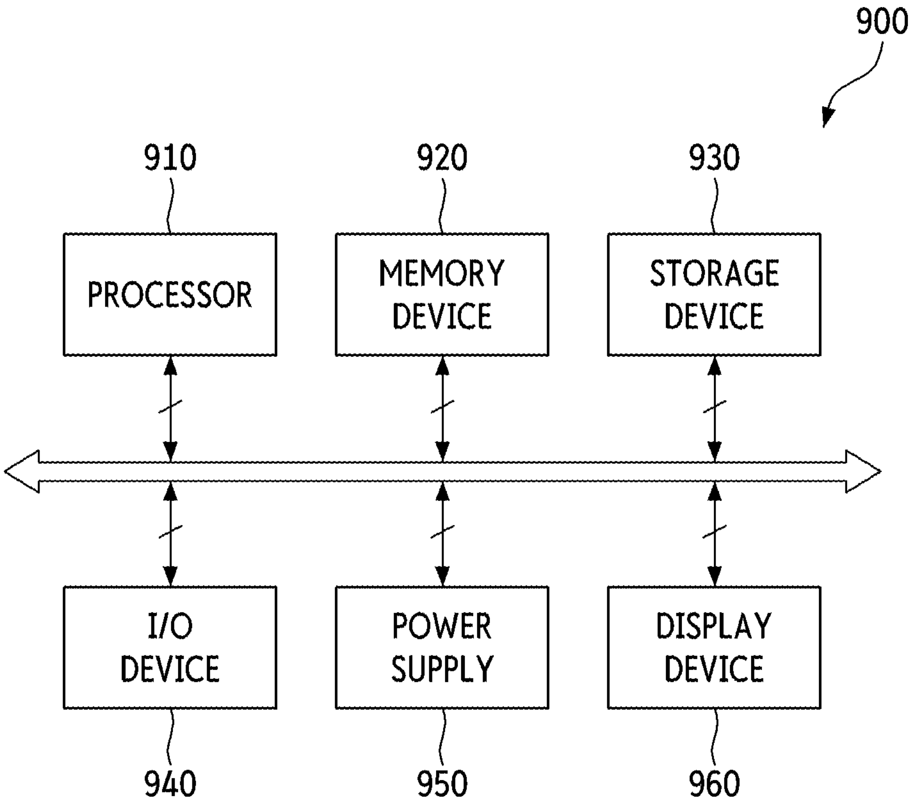
FIG. 16 is a block diagram illustrating an electronic device according to an embodiment.

FIG. 16 is a block diagram illustrating an electronic device according to an embodiment.

Referring to FIG. 16, in an embodiment, an electronic device 900 may include a processor 910, a memory device 920, a storage device 930, an input/output ("I/O") device 940, a power supply 950, and a display device 960. Here, the display device 960 may correspond to the display device described with reference to FIGS. 1 to 15. The electronic device 900 may further include a plurality of ports for communicating with a video card, a sound card, a memory card, a universal serial bus ("USB") device, or the like. In an embodiment, the electronic device 900 may be implemented as a television. In an embodiment, the electronic device 900 may be implemented as a smartphone. However, embodiments are not limited thereto. For example, in an embodiment, the electronic device 900 may be implemented as a cellular phone, a video phone, a smart pad, a smart watch, a tablet personal computer ("PC"), a car navigation system, a computer monitor, a laptop, a head disposed (e.g., mounted) display ("HMD"), or the like.

The processor 910 may perform various computing functions. In an embodiment, the processor 910 may be, for example, a microprocessor, a central processing unit ("CPU"), an application processor ("AP"), or the like. The processor 910 may be coupled to other components via, for example, an address bus, a control bus, a data bus, or the like. In an embodiment, the processor 910 may be coupled to an extended bus such as a peripheral component interconnection ("PCI") bus.

The memory device 920 may store data for operations of the electronic device 900. In an embodiment, the memory device 920 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, or the like, and/or at least one volatile memory device such as a dynamic random access memory ("DRAM") device, a static random access memory ("SRAM") device, a mobile DRAM device, or the like.

In an embodiment, the storage device 930 may include a solid state drive ("SSD") device, a hard disk drive ("HDD") device, a CD-ROM device, or the like. In an embodiment, the I/O device 940 may include an input device such as a keyboard, a keypad, a mouse device, a touchpad, a touchscreen, or the like, and an output device such as a printer, a speaker, or the like.

The power supply 950 may provide power for operations of the electronic device 900. The power supply 950 may provide power to the display device 960. The display device 960 may be coupled to other components via the buses or other communication links. In an embodiment, the display device 960 may be included in the I/O device 940. As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims. The embodiments of the present disclosure described herein should be considered in a descriptive sense only and not for purposes of limitation.

What is claimed is:

1. A scan driver, comprising:

a unit stage including a plurality of stages configured to receive a plurality of clock signals, including a first clock signal, and sequentially output a plurality of scan signals, wherein the unit stage includes one sharing circuit and a plurality of buffer circuits each corresponding to the plurality of stages, wherein the sharing circuit includes:

a first transistor configured to supply a start signal to a first node based on the first clock signal, which is received from a first clock line;

a second transistor configured to supply the first clock signal to a second node based on a voltage of the first node; and a third transistor configured to supply a gate low voltage to the second node based on the first clock signal, wherein each of the plurality of buffer circuits is directly connected to the first node and the second node and outputs the plurality of scan signals.

2. The scan driver of claim 1, wherein each of the plurality of buffer circuits includes:

a fourth transistor configured to supply a gate high voltage to an output node of its corresponding stage based on a voltage of the second node;

a fifth transistor configured to supply one of the plurality of clock signals to the output node of its corresponding stage; and a sixth transistor configured to supply the voltage of the first node to a gate electrode of the fifth transistor based on the gate low voltage.

3. The scan driver of claim 2, wherein each of the plurality of buffer circuits further includes:

a first capacitor connected between the second node and an input terminal of the gate high voltage; and a second capacitor connected between the gate electrode of the fifth transistor and the output node of its corresponding stage.

4. The scan driver of claim 3, further comprising:

a metal layer disposed on a substrate;

an active layer disposed on the metal layer and including a semiconductor area of the first transistor;

a first gate layer disposed on the active layer and including a gate electrode of the first transistor and a first electrode of the first capacitor;

a second gate layer disposed on the first gate layer and including a second electrode of the first capacitor;

a third gate layer disposed on the second gate layer;

a first source metal layer disposed on the third gate layer; and a second source metal layer disposed on the first source metal layer and including a plurality of clock lines configured to supply the plurality of clock signals.

5. The scan driver of claim 4, further comprising:

a first node electrode disposed in the second gate layer and corresponding to the first node;

a first connection electrode disposed in the first source metal layer and electrically connecting the first transistor, the first node electrode, and a sixth transistor of a first stage among the plurality of stages;

a second connection electrode disposed in the first source metal layer and electrically connecting the first node electrode and a sixth transistor of a second stage among the plurality of stages; and a third connection electrode disposed in the first source metal layer and electrically connecting the first node electrode and a sixth transistor of a third stage among the plurality of stages.

6. The scan driver of claim 5, wherein the first node electrode is disposed between the plurality of clock lines and does not overlap the second source metal layer.

7. The scan driver of claim 4, further comprising:

a first node electrode disposed in the second source metal layer and corresponding to the first node;

a first connection electrode disposed in the first source metal layer and electrically connecting the first transistor, the first node electrode, and a sixth transistor of a first stage among the plurality of stages;

a second connection electrode disposed in the first source metal layer and electrically connecting the first node electrode and a sixth transistor of a second stage among the plurality of stages; and a third connection electrode disposed in the first source metal layer and electrically connecting the first node electrode and a sixth transistor of a third stage among the plurality of stages.

8. The scan driver of claim 4, further comprising:

a second node electrode disposed in the second gate layer and corresponding to the second node;

a fourth connection electrode disposed in the first source metal layer and electrically connecting the second node electrode and a gate electrode of a fourth transistor of a first stage among the plurality of stages;

a fifth connection electrode disposed in the first source metal layer and electrically connecting the second node electrode and a gate electrode of a fourth transistor of a second stage among the plurality of stages; and a sixth connection electrode disposed in the first source metal layer and electrically connecting the second node electrode and a gate electrode of a fourth transistor of a third stage among the plurality of stages.

9. The scan driver of claim 4, wherein the first capacitor of each of the plurality of buffer circuits includes a first electrode disposed in the first gate layer and including a gate electrode of the fourth transistor, and a second electrode disposed in the second gate layer and overlapping the first electrode.

10. The scan driver of claim 4, further comprising:

a seventh connection electrode disposed in the first source metal layer and electrically connecting a second clock line and a first electrode of a fifth transistor of a first stage among the plurality of stages; and an eighth connection electrode disposed in the first source metal layer and electrically connecting a second electrode of the fifth transistor of the first stage and an output node of the first stage, wherein a second capacitor of the first stage includes a first electrode disposed in the first gate layer and including a gate electrode of the fifth transistor, and a second electrode disposed in the second gate layer and electrically connected to the eighth connection electrode.

11. The scan driver of claim 1, wherein each of the plurality of stages includes one of the first to third transistors, respectively.

12. The scan driver of claim 11, wherein when the plurality of stages includes four or more stages, each of three stages includes the first to third transistors, respectively, and the remaining stages include a dummy unit disposed on a same layer as the first to third transistors.

13. A scan driver, comprising:

first to third stages including one sharing circuit and a plurality of buffer circuits configured to sequentially output a plurality of scan signals, wherein the sharing circuit includes:

a first transistor configured to supply a start signal to a first node based on a first clock signal among a plurality of clock signals;

a second transistor configured to supply the first clock signal to a second node based on a voltage of the first node; and a third transistor configured to supply a gate low voltage to the second node based on the first clock signal, and the buffer circuit of each of the first to third stages includes:

a fourth transistor configured to supply a gate high voltage to an output node of its corresponding stage based on a voltage of the second node;

a fifth transistor configured to supply one of the plurality of clock signals to the output node; and a sixth transistor configured to supply the voltage of the first node to a gate electrode of the fifth transistor based on the gate low voltage.

14. The scan driver of claim 13, further comprising:

a metal layer disposed on a substrate;

an active layer disposed on the metal layer and including a semiconductor area of the first transistor;

a first gate layer disposed on the active layer and including a gate electrode of the first transistor and a first electrode of a first capacitor;

a second gate layer disposed on the first gate layer and including a second electrode of the first capacitor;

a third gate layer disposed on the second gate layer;

a first source metal layer disposed on the third gate layer; and a second source metal layer disposed on the first source metal layer and including a plurality of clock lines configured to supply the plurality of clock signals.

15. The scan driver of claim 14, further comprising:

a first connection electrode disposed in the first source metal layer and electrically connecting the first transistor and a sixth transistor of the first stage; and a first node electrode disposed in the second gate layer, connected to the first connection electrode, and corresponding to the first node, wherein the first node electrode is disposed between the plurality of clock lines and does not overlap the second source metal layer.

16. An electronic device, comprising:

a display device; and a power supply configured to provide power to the display device, wherein the display device comprises:

a display panel including a plurality of data lines to which a plurality of data voltages are applied, a plurality of gate lines intersecting the plurality of data lines and, and a plurality of pixels connected to the data lines and the gate lines, wherein a gate signal is applied to each of the gate lines;

a data driver configured to supply the data voltages to the data lines; and a scan driver configured to sequentially supply the gate signals to the gate lines, wherein the scan driver includes first to third stages including one sharing circuit and a plurality of buffer circuits configured to sequentially output a plurality of scan signals, wherein the sharing circuit includes:

a first transistor configured to supply a start signal to a first node based on a first clock signal, among a plurality of clock signals, received from a first clock line, among a plurality of clock lines;

a second transistor configured to supply the first clock signal to a second node based on a voltage of the first node; and a third transistor configured to supply a gate low voltage to the second node based on the first clock signal, wherein each of the plurality of buffer circuits is directly connected to the first node and the second node and is configured to output a first gate signal, among the plurality of gate signals, to a first gate line, among the plurality of gate lines.

17. The electronic device of claim 16, further comprising:

a metal layer disposed on a substrate;

an active layer disposed on the metal layer and including a semiconductor area of the first transistor;

a first gate layer disposed on the active layer and including a gate electrode of the first transistor and a first electrode of a first capacitor;

a second gate layer disposed on the first gate layer and including a second electrode of the first capacitor;

a third gate layer disposed on the second gate layer;

a first source metal layer disposed on the third gate layer; and a second source metal layer disposed on the first source metal layer and including the plurality of clock lines, which are configured to supply the plurality of clock signals.

18. The electronic device of claim 17, wherein the pixel includes:

a first pixel transistor configured to control a driving current flowing through a light-emitting element;

a second pixel transistor configured to supply a data voltage, among the plurality of data voltages, to a first electrode of the first pixel transistor based on the first gate signal;

a third pixel transistor configured to electrically connect a second electrode and a gate electrode of the first pixel transistor based on a second gate signal among the plurality of gate signals;

a fourth pixel transistor configured to supply an initialization voltage to the gate electrode of the first pixel transistor based on a third gate signal among the plurality of gate signals; and a fifth pixel transistor configured to supply a driving voltage to the first electrode of the first pixel transistor based on a light-emitting signal.

19. The electronic device of claim 18, further comprising:

a first node electrode disposed in the second gate layer and corresponding to the first node;

a second gate line, among the plurality of gate lines, disposed in the third gate layer and configured to supply the second gate signal; and a light emitting line disposed in the third gate layer and configured to supply the light-emitting signal.

20. The electronic device of claim 18, further comprising:

a first node electrode disposed in the second source metal layer and corresponding to the first node;

a second gate line, among the plurality of gate lines, disposed in the second gate layer and configured to supply the second gate signal; and a light emitting line disposed in the third gate layer and configured to supply the light-emitting signal.

* * * * *